United States Patent
Wang et al.

(10) Patent No.: US 12,262,400 B2
(45) Date of Patent: Mar. 25, 2025

(54) SCHEDULING METHOD, SCHEDULING ALGORITHM TRAINING METHOD, RELATED SYSTEM, AND STORAGE MEDIUM

(71) Applicant: HUAWEI TECHNOLOGIES CO., LTD., Guangdong (CN)

(72) Inventors: Jian Wang, Hangzhou (CN); Chen Xu, Hangzhou (CN); Yourui Huangfu, Hangzhou (CN); Rong Li, Hangzhou (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 420 days.

(21) Appl. No.: 17/889,499

(22) Filed: Aug. 17, 2022

(65) Prior Publication Data

US 2022/0394727 A1    Dec. 8, 2022

Related U.S. Application Data

(63) Continuation of application No. PCT/CN2021/073764, filed on Jan. 26, 2021.

(30) Foreign Application Priority Data

Feb. 19, 2020 (CN) .......................... 202010106750.2

(51) Int. Cl.
*H04W 72/54* (2023.01)
*H04W 72/20* (2023.01)

(52) U.S. Cl.
CPC ........... *H04W 72/54* (2023.01); *H04W 72/20* (2023.01)

(58) Field of Classification Search
CPC .............................. H04W 72/54; H04W 72/20
(Continued)

(56) References Cited

U.S. PATENT DOCUMENTS 8,339,964 B2 * 12/2012 Fodor ............... H04W 28/0284
                                                           370/237
8,854,970 B2 * 10/2014 Ericson ................... H04L 47/17
                                                           370/252
(Continued)

FOREIGN PATENT DOCUMENTS

CN      108966352 A      12/2018
CN      109471712 A       3/2019
(Continued)

OTHER PUBLICATIONS

Hu Shangping, Service-Aware Adaptive Flow Scheduling Technology in Software Defined Network, Master's Thesis, 2018, with the English Abstract, 78 pages.
(Continued)

*Primary Examiner* — Melvin H Pollack

(57) ABSTRACT

A scheduling method, scheduling algorithm training method, related system, and storage medium are provided including the scheduling method being applied to a scheduling control system, which includes K network devices, and K is an integer greater than 1. The method further includes a first network device that obtains target state information of a first area, where the target state information includes network state information and user data packet cache information. The first network device generates first scheduling information based on the target state information of the first area and a first target sub-policy network, where the first target sub-policy network is a target sub-policy network that is in K target sub-policy networks and that corresponds to the first network device. The first network device delivers the first scheduling information to a terminal in the first area.

20 Claims, 12 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 9,503,995 | B2* | 11/2016 | Sun | H04W 56/00 |
| 9,548,927 | B2* | 1/2017 | Luke | H04L 45/7453 |
| 9,973,966 | B2* | 5/2018 | Karampatsis | H04W 28/0268 |
| 10,940,863 | B2* | 3/2021 | Palanisamy | G06N 5/046 |
| 11,012,215 | B2* | 5/2021 | Liu | H04W 72/1268 |
| 11,017,107 | B2* | 5/2021 | Rungta | G06F 9/5077 |
| 11,195,057 | B2* | 12/2021 | Zadeh | G06N 3/006 |
| 11,199,837 | B2* | 12/2021 | Cella | H04B 17/309 |
| 11,212,155 | B2* | 12/2021 | Rajagopal | H04L 27/2657 |
| 11,244,242 | B2* | 2/2022 | Prakash | H04L 43/20 |
| 11,356,329 | B2* | 6/2022 | Jamkhedkar | H04L 41/145 |
| 11,368,924 | B2* | 6/2022 | Yang | H04W 52/262 |
| 11,386,367 | B1* | 7/2022 | Tabrizi | G06Q 10/063116 |
| 11,636,379 | B2* | 4/2023 | Zhou | G06F 9/3828 706/10 |
| 11,861,643 | B2* | 1/2024 | Shang | G06N 3/08 |
| 11,916,929 | B1* | 2/2024 | Thimmegowda | H04L 63/1425 |
| 11,934,871 | B1* | 3/2024 | Zhang | G06F 9/4881 |
| 12,035,380 | B2* | 7/2024 | Yu | G06N 3/006 |
| 12,040,856 | B2* | 7/2024 | Sankaran | G06N 3/045 |
| 12,079,720 | B2* | 9/2024 | Park | G06N 3/08 |
| 12,127,059 | B2* | 10/2024 | Melodia | H04B 17/336 |
| 2014/0250436 | A1* | 9/2014 | Tang | G06F 9/466 718/1 |
| 2020/0015101 | A1 | 1/2020 | Kucera et al. | |
| 2020/0045672 | A1* | 2/2020 | Yang | H04W 48/12 |
| 2022/0167379 | A1* | 5/2022 | Fu | H04L 1/1854 |

FOREIGN PATENT DOCUMENTS

| | | | | |
|---|---|---|---|---|
| CN | 109688597 A | 4/2019 | | |
| CN | 110012547 A | 7/2019 | | |
| CN | 110278149 A | 9/2019 | | |
| CN | 110580196 A | 12/2019 | | |
| CN | 110662238 A | 1/2020 | | |
| CN | 110708259 A | 1/2020 | | |
| CN | 110770761 A | 2/2020 | | |
| CN | 110809904 A | 2/2020 | | |
| EP | 3691349 A1 * | 8/2020 | | H04W 52/143 |
| WO | WO-2012130076 A1 * | 10/2012 | | H04W 72/12 |
| WO | WO-2019196896 A1 * | 10/2019 | | H04W 72/0453 |

OTHER PUBLICATIONS

International Search Report dated Apr. 30, 2021 issued for International Application No. PCT/CN2021/073764 (9 pages).
Office Action dated Sep. 5, 2022 issued for Chinese Application No. 202010106750.2 (6 pages).
Yan Mu et al: "Multi-RAT Access Based on Multi-Agent Reinforcement Learning",Globecom 2017-2017 IEEE Global Communications Conference, IEEE, Dec. 4, 2017 (Dec. 4, 2017), pp. 1-6, XP033300555, DOI:10.1109/GLOCOM.2017.8254980[retrieved on Jan. 11, 2018.
Extended European Search Report dated May 30, 2023, issued for European Application No. 21757207.2 (10 pages).

* cited by examiner

SCHEDULING METHOD, SCHEDULING ALGORITHM TRAINING METHOD, RELATED SYSTEM, AND STORAGE MEDIUM

CROSS-REFERENCE TO RELATED APPLICATIONS

This application is a continuation of International Application No. PCT/CN2021/073764, filed on Jan. 26, 2021, which claims priority to Chinese Patent Application No. 202010106750.2, filed on Feb. 19, 2020. The disclosures of the aforementioned applications are hereby incorporated by reference in their entireties.

TECHNICAL FIELD

This disclosure relates to the field of communication technologies, and in particular, to a scheduling method, a scheduling algorithm training method, a scheduling control system, a scheduling algorithm training system, and a storage medium.

BACKGROUND

In a cellular network, medium access control (MAC) layer scheduling is mainly used to resolve a problem such as time-frequency resource allocation, modulation and coding scheme (MCS) selection, user pairing, and precoding, and implement a compromise between a throughput and fairness of a system through scheduling.

A Markov decision process (MDP) is a mathematical model for analyzing a decision problem. As shown in FIG. 1, it is assumed that an environment has a Markov property (conditional probability distribution of a future state of the environment depends only on a current state). A decision maker periodically observes a state of the environment, makes a decision based on the current state of the environment, and obtains a new state and a reward after interaction with the environment.

Reinforcement learning is a field in machine learning, and may be used to solve the foregoing Markov decision process. As shown in FIG. 2, reinforcement learning emphasizes that an agent obtains a maximum expected reward and learns an optimal behavior manner by using a process of interacting with an environment. The agent obtains a current state by observing the environment, and makes a decision about an action a according to a specified rule π, to feed back the action to the environment. The environment feeds back, to the agent, a reward r or a penalty that is obtained after the action is performed. Through a plurality of times of iterative training, the agent learns to make an optimal decision based on a state of the environment.

As shown in FIG. 3, deep reinforcement learning (DRL) is obtained by combining reinforcement learning and deep learning. Compared with FIG. 2 and FIG. 3, it may be found that deep reinforcement learning still conforms to a framework in which the agent interacts with the environment in reinforcement learning. A difference is that a deep neural network is used in the agent to make a decision.

To perform scheduling in a wireless transmission environment that dynamically changes, a deep reinforcement learning DRL algorithm is used in a conventional technology. In the algorithm, an agent in the DRL continuously updates a parameter of the agent by interacting with the wireless transmission environment, to obtain a good decision policy. The agent first obtains a current state of a communication system, and makes a decision based on the state. After the decision is implemented, the communication system enters a next state, and feeds back a reward. The agent adjusts a decision parameter of the agent based on the reward. The agent iteratively interacts with the environment, continuously adjusts the parameter of the agent to obtain a larger reward, and may obtain a good scheduling policy after final convergence. In the conventional technology, a centralized scheduling solution is used, and a unique agent is responsible for decision-making of all cells/networks in the entire network. In a scenario of a multi-cell network or a multi-level heterogeneous network, if the conventional technology is used, an action space is excessively large, and a training process of a neural network used by the agent is very slow and has difficulty in converging. Therefore, in an actual system, feasibility of deploying the centralized scheduling solution is extremely low.

SUMMARY

This disclosure discloses a scheduling method, a scheduling algorithm training method, a related system, and a storage medium, to implement distributed scheduling based on a plurality of agents, and improve system performance.

According to a first aspect, an embodiment of this disclosure provides a scheduling method, where the method is applied to a scheduling control system, the scheduling control system includes K network devices, K is an integer greater than 1, and the method includes:

A first network device obtains target state information of a first area, where the first network device is any one of the K network devices, the first area is an area covered by the first network device, and the target state information includes network state information and user data packet cache information;

the first network device generates first scheduling information based on the target state information of the first area and a first target sub-policy network, where the first target sub-policy network is a target sub-policy network that is in K target sub-policy networks and that corresponds to the first network device, and the K target sub-policy networks are in a one-to-one correspondence with the K network devices; and the first network device delivers the first scheduling information to a terminal in the first area, where the first scheduling information is used by the terminal in the first area for data transmission.

In this embodiment of this disclosure, the first network device in the K network devices obtains the target state information of the first area, then obtains the scheduling information based on the target state information and the first target sub-policy network corresponding to the first network device, and delivers the scheduling information to the terminal in the first area, so that each terminal in the first area transmits data based on the scheduling information. In the method, each network device performs scheduling control on a policy network corresponding to the network device, to implement multi-agent scheduling control, and improve performance of the scheduling control system. In addition, feasibility of a scheduling control solution is improved by deploying policy networks in a distributed manner.

Before the first network device generates the first scheduling information based on the target state information of the first area and the first target sub-policy network, the method further includes:

The first network device performs iterative training on a first initial sub-policy network to obtain the first target sub-policy network; and that first network device performs iterative training on a first initial sub-policy network to obtain the first target sub-policy network includes:

the first network device obtains a performance parameter based on target state information $S_{i+1}$ of the first area; and when a value of the performance parameter is not less than a preset value, the first network device determines a first sub-policy network $W_i$ as the first target sub-policy network, where i is a positive integer, the target state information $S_{i+1}$ of the first area is obtained by the terminal in the first area through data transmission based on second scheduling information, the second scheduling information is generated by the first network device based on target state information $S_i$ of the first area and the first sub-policy network $W_i$, the target state information $S_i$ is target state information to be used in an $i^{th}$ time of training, and when i=1, the first sub-policy network $W_i$ is the first initial sub-policy network.

In this embodiment, training is stopped when the value of the performance parameter is not less than the preset value. Certainly, the foregoing condition is not limited in this embodiment of this disclosure. In this embodiment of this disclosure, alternatively, training may be stopped when the value of the performance parameter is not greater than the preset value. For example, a new preset value is obtained by inverting the foregoing preset value.

In this disclosure, alternatively, training may be stopped when a quantity of times of iterative training reaches a preset quantity of times. Alternatively, training is stopped when a quantity of times of parameter update reaches a preset quantity of times, or the like.

Alternatively, in this embodiment of this disclosure, training may be stopped when a value of a loss function corresponding to a policy network is less than a preset threshold, or the like.

When the value of the performance parameter is less than the preset value, the first network device adjusts a parameter of the first sub-policy network $W_i$ based on the target state information $S_i$, an output result of the first sub-policy network $W_i$, the target state information $S_{i+1}$, and an evaluation value of the first sub-policy network $W_i$, to obtain a first sub-policy network used for next training, where the evaluation value of the first sub-policy network $W_i$ is obtained through processing based on a value network $Q_i$, and the value network $Q_i$ is obtained based on a value network that is previously trained.

The evaluation value of the first sub-policy network $W_i$ is obtained by inputting, into the value network $Q_i$ for processing, target state information of K areas covered by the K network devices, output results of K sub-policy networks corresponding to the K network devices, and feedback rewards corresponding to the K areas, where the feedback rewards corresponding to the K areas are determined by terminals in the K areas through data transmission based on second scheduling information respectively corresponding to the K areas.

In another optional implementation, when the value of the performance parameter is less than the preset value, the first network device adjusts a parameter of the first sub-policy network $W_i$ based on the target state information $S_i$, an output result of the first sub-policy network $W_i$, the target state information $S_{i+1}$, and an evaluation value of the first sub-policy network $W_i$, to obtain a first sub-policy network used for next training, where the evaluation value of the first sub-policy network $W_i$ is obtained through processing based on a first sub-value network $q_i$, the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

The evaluation value of the first sub-policy network $W_i$ is obtained by inputting, into the first sub-value network $q_i$ for processing, the target state information $S_i$ and the target state information $S_{i+1}$ of the first area covered by the first network device, the output result of the first sub-policy network $W_i$ corresponding to the first network device, a feedback reward corresponding to the first area, and information about K−1 sub-value networks other than the first sub-value network $q_i$, where the feedback reward corresponding to the first area is determined by the terminal in the first area through data transmission based on the second scheduling information corresponding to the first area.

In still another optional implementation, the scheduling control system further includes a centralized network element device, and before the first network device generates the first scheduling information based on the target state information of the first area and the first target sub-policy network, the method further includes:

The first network device receives a parameter that is of the first target sub-policy network and that is sent by the centralized network element device, where parameters of the K target sub-policy networks are the same, and the centralized network element device is a core network device or a base station centralized unit (CU) device.

According to a first aspect, an embodiment of this disclosure further provides a scheduling algorithm training method, where the method is applied to a scheduling algorithm training system, the scheduling algorithm training system includes K network devices, K is an integer greater than 1, and the method includes:

A first network device obtains training data, where the first network device is any one of the K network devices; and the first network device performs iterative training on a first initial sub-policy network based on the training data, to obtain a first target sub-policy network, where the first initial sub-policy network is an initial sub-policy network that is in K initial sub-policy networks and that corresponds to the first network device, the first target sub-policy network is a target sub-policy network that is in K target sub-policy networks and that corresponds to the first network device, and the K initial sub-policy networks and the K target sub-policy networks are respectively in a one-to-one correspondence with the K network devices.

The training data includes target state information $S_{i+1}$ of a first area, the first area is an area covered by the first network device, and that the first network device performs iterative training on a first initial sub-policy network based on the training data, to obtain a first target sub-policy network includes:

The first network device obtains a performance parameter based on the target state information $S_{i+1}$ of the first area; and when a value of the performance parameter is not less than a preset value, the first network device determines a first sub-policy network $W_i$ as the first target sub-policy network, where i is a positive integer, the target state information $S_{i+1}$ of the first area is obtained by a terminal in the first area through data transmission based on second scheduling information, the second scheduling information is generated by the first network device based on target state information $S_i$ of the first area and the first sub-policy network $W_i$, the target state information $S_i$ is target state information to be used in an $i^{th}$ time of training, and when i=1, the first sub-policy network $W_i$ is the first initial sub-policy network.

When the value of the performance parameter is less than the preset value, the first network device adjusts a parameter of the first sub-policy network $W_i$ based on the target state information $S_i$, an output result of the first sub-policy network $W_i$, the target state information $S_{i+1}$, and an evaluation value of the first sub-policy network $W_i$, to obtain a first sub-policy network used for next training, where the evaluation value of the first sub-policy network $W_i$ is obtained through processing based on a value network $Q_i$, and the value network $Q_i$ is obtained based on a value network that is previously trained.

The evaluation value of the first sub-policy network $W_i$ is obtained by inputting, into the value network $Q_i$ for processing, target state information of K areas covered by the K network devices, output results of sub-policy networks respectively corresponding to the K network devices, and feedback rewards corresponding to the K areas, where the feedback rewards corresponding to the K areas are determined by terminals in the K areas through data transmission based on second scheduling information respectively corresponding to the K areas.

In this embodiment of this disclosure, training is performed based on a multi-agent reinforcement learning (MARL) architecture including a centralized value network and distributed policy networks, to obtain one target value network and a plurality of distributed target policy networks. The distributed target policy network may be used by a network device for scheduling, so that fully centralized scheduling in a single-agent DRL is avoided, and solution feasibility is improved.

In another optional implementation, when the value of the performance parameter is less than the preset value, the first network device adjusts a parameter of the first sub-policy network $W_i$ based on the target state information $S_i$, an output result of the first sub-policy network $W_i$, the target state information $S_{i+1}$, and an evaluation value of the first sub-policy network $W_i$, to obtain a first sub-policy network used for next training, where the evaluation value of the first sub-policy network $W_i$ is obtained through processing based on a first sub-value network $q_i$, the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

The evaluation value of the first sub-policy network $W_i$ is obtained by inputting, into the first sub-value network $q_i$ for processing, the target state information $S_i$ and the target state information $S_{i+1}$ of the first area covered by the first network device, the output result of the first sub-policy network $W_i$ corresponding to the first network device, a feedback reward corresponding to the first area, and information about K−1 sub-value networks other than the first sub-value network $q_i$, where the feedback reward corresponding to the first area is determined by the terminal in the first area through data transmission based on the second scheduling information corresponding to the first area.

In this embodiment of this disclosure, training is performed based on a MARL architecture including distributed value networks and distributed policy networks, to obtain a plurality of target value networks and a plurality of distributed target policy networks. The distributed target policy network may be used by a network device for scheduling, so that fully centralized scheduling in a single-agent DRL is avoided, and solution feasibility is improved.

In still another optional implementation, the method further includes:

The first network device determines a first sub-value network $q_i$ as a first target sub-value network, where the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

When the value of the performance parameter is less than the preset value, the first network device inputs, into the first sub-value network $q_i$ for processing, the target state information $S_i$ and the target state information $S_{i+1}$ of the first area, an output result of the first sub-policy network $W_i$ corresponding to the first network device, a feedback reward corresponding to the first area, and information about K−1 sub-value networks other than the first sub-value network $q_i$, to obtain an evaluation value of the first sub-policy network $W_i$, where the feedback reward corresponding to the first area is determined by the terminal in the first area through data transmission based on the second scheduling information corresponding to the first area; and the first network device adjusts a parameter of the first sub-value network $q_i$ to obtain a first sub-value network used for next training.

In still another optional implementation, the scheduling algorithm training system further includes a centralized network element device, and when the value of the performance parameter is not less than the preset value, the method further includes:

The centralized network element device determines a value network $Q_i$ as a target value network, where the value network $Q_i$ is obtained based on a value network that is previously trained.

When the value of the performance parameter is less than the preset value, the centralized network element device inputs, into the value network $Q_i$ for processing, target state information of K areas covered by the K network devices, output results of K sub-policy networks corresponding to the K network devices, and feedback rewards corresponding to the K areas, to obtain K evaluation values, where the K evaluation values are in a one-to-one correspondence with the K sub-policy networks;

the centralized network element device respectively sends the K evaluation values to the K network devices; and
the centralized network element device adjusts a parameter of the value network $Q_i$ to obtain a value network used for next training.

In still another optional implementation, the scheduling algorithm training system further includes a centralized network element device, and when the value of the performance parameter is not less than the preset value, the method further includes:

The centralized network element device determines a first sub-value network $q_i$ as a first target sub-value network, where the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

When the value of the performance parameter is less than the preset value, the centralized network element device inputs, into the first sub-value network $q_i$ for processing, the target state information $S_i$ and the target state information $S_{i+1}$ of the first area, an output result of the first sub-policy network $W_i$ corresponding to the first network device, a feedback reward corresponding to the first area, and information about K−1 sub-value networks other than the first sub-value network $q_i$, to obtain an evaluation value of the first sub-policy network $W_i$, where the feedback reward corresponding to the first area is determined by the terminal in the first area through data transmission based on the second scheduling information corresponding to the first area; and the centralized network element device adjusts a parameter of the first sub-value network $q_i$ to obtain a first sub-value network used for next training.

According to a third aspect, an embodiment of this disclosure further provides a scheduling control system, where the scheduling control system includes K network devices, K is an integer greater than 1, a first network device is any one of the K network devices, and the first network device is configured to:

obtain target state information of a first area, where the first area is an area covered by the first network device, and the target state information includes network state information and user data packet cache information;

generate first scheduling information based on the target state information of the first area and a first target sub-policy network, where the first target sub-policy network is a target sub-policy network that is in K target sub-policy networks and that corresponds to the first network device, and the K target sub-policy networks are in a one-to-one correspondence with the K network devices; and deliver the first scheduling information to a terminal in the first area, where the first scheduling information is used by the terminal in the first area for data transmission.

Before generating the first scheduling information based on the target state information of the first area and the first target sub-policy network, the first network device is further configured to:

perform iterative training on a first initial sub-policy network to obtain the first target sub-policy network; and the performing iterative training on a first initial sub-policy network to obtain the first target sub-policy network specifically includes:

obtaining a performance parameter based on target state information $S_{i+1}$ of the first area; and when a value of the performance parameter is not less than a preset value, determining a first sub-policy network $W_i$ as the first target sub-policy network, where i is a positive integer, the target state information $S_{i+1}$ of the first area is obtained by the terminal in the first area through data transmission based on second scheduling information, the second scheduling information is generated based on target state information $S_i$ of the first area and the first sub-policy network $W_i$, the target state information $S_i$ is target state information to be used in an $i^{th}$ time of training, and when i=1, the first sub-policy network $W_i$ is the first initial sub-policy network.

When the value of the performance parameter is less than the preset value, the first network device is configured to:

adjust a parameter of the first sub-policy network $W_i$ based on the target state information $S_i$, an output result of the first sub-policy network $W_i$, the target state information $S_{i+1}$, and an evaluation value of the first sub-policy network $W_i$, to obtain a first sub-policy network used for next training, where the evaluation value of the first sub-policy network $W_i$ is obtained through processing based on a value network $Q_i$, and the value network $Q_i$ is obtained based on a value network that is previously trained.

The evaluation value of the first sub-policy network $W_i$ is obtained by inputting, into the value network $Q_i$ for processing, target state information of K areas covered by the K network devices, output results of K sub-policy networks corresponding to the K network devices, and feedback rewards corresponding to the K areas, where the feedback rewards corresponding to the K areas are determined by terminals in the K areas through data transmission based on second scheduling information respectively corresponding to the K areas.

In another optional implementation, when the value of the performance parameter is less than the preset value, the first network device is configured to:

adjust a parameter of the first sub-policy network $W_i$ based on the target state information $S_i$, an output result of the first sub-policy network $W_i$, the target state information $S_{i+1}$, and an evaluation value of the first sub-policy network $W_i$, to obtain a first sub-policy network used for next training, where the evaluation value of the first sub-policy network $W_i$ is obtained through processing based on a first sub-value network $q_i$, the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

The evaluation value of the first sub-policy network $W_i$ is obtained by inputting, into the first sub-value network $q_i$ for processing, the target state information $S_i$ and the target state information $S_{i+1}$ of the first area covered by the first network device, the output result of the first sub-policy network $W_i$ corresponding to the first network device, a feedback reward corresponding to the first area, and information about K−1 sub-value networks other than the first sub-value network $q_i$, where the feedback reward corresponding to the first area is determined by the terminal in the first area through data transmission based on the second scheduling information corresponding to the first area.

In still another optional implementation, the scheduling control system further includes a centralized network element device, and before generating the first scheduling information based on the target state information of the first area and the first target sub-policy network, the first network device is further configured to:

receive a parameter that is of the first target sub-policy network and that is sent by the centralized network element device, where parameters of the K target sub-policy networks are the same, and the centralized network element device is a core network device or a base station centralized unit (CU) device.

According to a fourth aspect, an embodiment of this disclosure further provides a scheduling algorithm training system, where the scheduling algorithm training system includes K network devices, K is an integer greater than 1, a first network device is any one of the K network devices, and the first network device is configured to:

obtain training data; and perform iterative training on a first initial sub-policy network based on the training data, to obtain a first target sub-policy network, where the first initial sub-policy network is an initial sub-policy network that is in K initial sub-policy networks and that corresponds to the first network device, the first target sub-policy network is a target sub-policy network that is in K target sub-policy networks and that corresponds to the first network device, and the K initial sub-policy networks and the K target sub-policy networks are respectively in a one-to-one correspondence with the K network devices.

The training data includes target state information $S_{i+1}$ of a first area, the first area is an area covered by the first network device, and the first network device is specifically configured to:

obtain a performance parameter based on the target state information $S_{i+1}$ of the first area; and when a value of the performance parameter is not less than a preset value, determine a first sub-policy network $W_i$ as the first target sub-policy network, where i is a positive integer, the target state information $S_{i+1}$ of the first area is obtained by a terminal in the first area through data transmission based on second scheduling information, the second scheduling information is generated based on target state information $S_i$ of the first area and the first sub-policy network $W_i$, the target state information $S_i$ is target state information to be used in an $i^{th}$ time of training, and when i=1, the first sub-policy network $W_i$ is the first initial sub-policy network.

When the value of the performance parameter is less than the preset value, the first network device is configured to:

adjust a parameter of the first sub-policy network $W_i$ based on the target state information $S_i$, an output result of the first sub-policy network $W_i$, the target state information $S_{i+1}$, and an evaluation value of the first sub-policy network $W_i$, to obtain a first sub-policy network used for next training, where the evaluation value of the first sub-policy network $W_i$ is obtained through processing based on a value network $Q_i$, and the value network $Q_i$ is obtained based on a value network that is previously trained.

The evaluation value of the first sub-policy network $W_i$ is obtained by inputting, into the value network $Q_i$ for processing, target state information of K areas covered by the K network devices, output results of sub-policy networks respectively corresponding to the K network devices, and feedback rewards corresponding to the K areas, where the feedback rewards corresponding to the K areas are determined by terminals in the K areas through data transmission based on second scheduling information respectively corresponding to the K areas.

In another optional implementation, when the value of the performance parameter is less than the preset value, the first network device is configured to:

adjust a parameter of the first sub-policy network $W_i$ based on the target state information $S_i$, an output result of the first sub-policy network $W_i$, the target state information $S_{i+1}$, and an evaluation value of the first sub-policy network $W_i$, to obtain a first sub-policy network used for next training, where the evaluation value of the first sub-policy network $W_i$ is obtained through processing based on a first sub-value network $q_i$, the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

The evaluation value of the first sub-policy network $W_i$ is obtained by inputting, into the first sub-value network $q_i$ for processing, the target state information $S_i$ and the target state information $S_{i+1}$ of the first area covered by the first network device, the output result of the first sub-policy network $W_i$ corresponding to the first network device, a feedback reward corresponding to the first area, and information about K−1 sub-value networks other than the first sub-value network $q_i$, where the feedback reward corresponding to the first area is determined by the terminal in the first area through data transmission based on the second scheduling information corresponding to the first area.

In still another optional implementation, the first network device is further configured to:

determine a first sub-value network $q_i$ as a first target sub-value network, where the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

When the value of the performance parameter is less than the preset value, the first network device is further configured to:

input, into the first sub-value network $q_i$ for processing, the target state information $S_i$ and the target state information $S_{i+1}$ of the first area, an output result of the first sub-policy network $W_i$ corresponding to the first network device, a feedback reward corresponding to the first area, and information about K−1 sub-value networks other than the first sub-value network $q_i$, to obtain an evaluation value of the first sub-policy network $W_i$, where the feedback reward corresponding to the first area is determined by the terminal in the first area through data transmission based on the second scheduling information corresponding to the first area; and adjust, by the first network device, a parameter of the first sub-value network $q_i$ to obtain a first sub-value network used for next training.

In still another optional implementation, the scheduling algorithm training system further includes a centralized network element device, and when the value of the performance parameter is not less than the preset value, the centralized network element device is configured to:

determine a value network $Q_i$ as a target value network, where the value network $Q_i$ is obtained based on a value network that is previously trained.

When the value of the performance parameter is less than the preset value, the centralized network element device is configured to:

input, into the value network $Q_i$ for processing, target state information of K areas covered by the K network devices, output results of K sub-policy networks corresponding to the K network devices, and feedback rewards corresponding to the K areas, to obtain K evaluation values, where the K evaluation values are in a one-to-one correspondence with the K sub-policy networks;

respectively send the K evaluation values to the K network devices; and adjust a parameter of the value network $Q_i$ to obtain a value network used for next training.

In still another optional implementation, the scheduling algorithm training system further includes a centralized network element device, and when the value of the performance parameter is not less than the preset value, the centralized network element device is configured to:

determine a first sub-value network $q_i$ as a first target sub-value network, where the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

When the value of the performance parameter is less than the preset value, the centralized network element device is configured to:

input, into the first sub-value network $q_i$ for processing, the target state information $S_i$ and the target state information $S_{i+1}$ of the first area, an output result of the first sub-policy network $W_i$ corresponding to the first network device, a feedback reward corresponding to the first area, and information about K−1 sub-value networks other than the first sub-value network $q_i$, to obtain an evaluation value of the first sub-policy network $W_i$, where the feedback reward corresponding to the first area is determined by the terminal in the first area through data transmission based on the second scheduling information corresponding to the first area; and adjust a parameter of the first sub-value network $q_i$ to obtain a first sub-value network used for next training.

According to a fifth aspect, this disclosure provides a computer storage medium, including computer instructions, where when the computer instructions are run on an electronic device, the electronic device is enabled to perform the method provided in any one of the possible implementations of the first aspect and/or any one of the possible implementations of the second aspect.

According to a sixth aspect, an embodiment of this disclosure provides a computer program product, where when the computer program product runs on a computer, the computer is enabled to perform the method provided in any one of the possible implementations of the first aspect and/or any one of the possible implementations of the second aspect.

It may be understood that the apparatus according to the third aspect, the apparatus according to the fourth aspect, the computer storage medium according to the fifth aspect, or the computer program product according to the sixth aspect that is provided above is configured to perform the method provided in any one of the possible implementations of the first aspect and the method provided in any one of the possible implementations of the second aspect. Therefore, for beneficial effects that can be achieved, refer to beneficial effects in a corresponding method, and details are not described herein again.

BRIEF DESCRIPTION OF DRAWINGS

The following describes accompanying drawings used in the embodiments of this disclosure.

DESCRIPTION OF EMBODIMENTS

The following describes the embodiments of this disclosure with reference to the accompanying drawings in the embodiments of this disclosure. Terms used in the implementations of the embodiments of this disclosure are merely intended to describe specific embodiments of this disclosure, but not to limit this disclosure.

Figure 1:
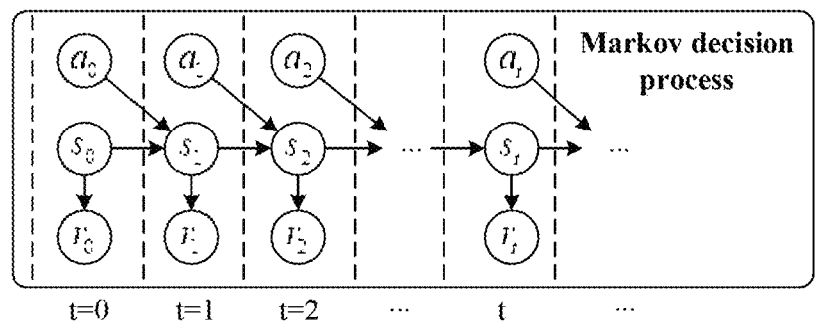
FIG. 1 is a schematic diagram of a Markov decision process in a conventional technology.
Figure 2:
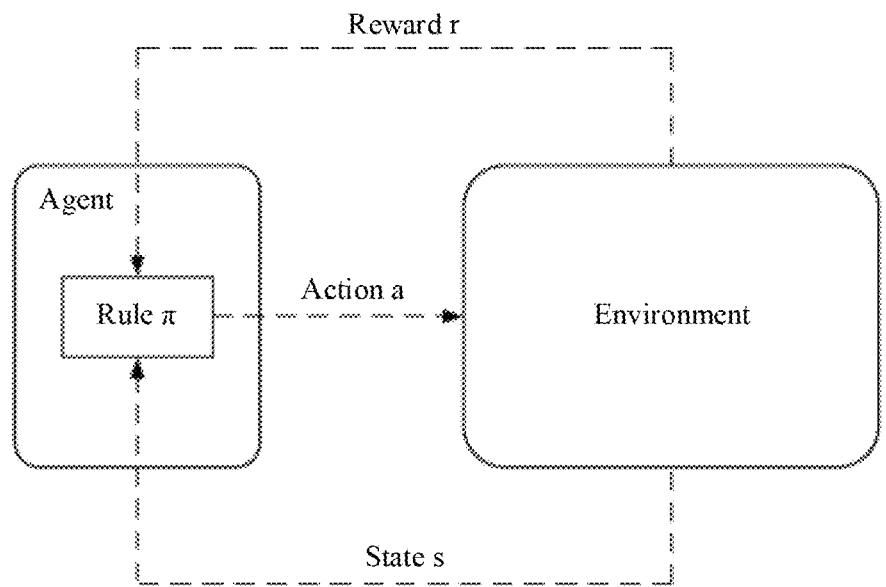
FIG. 2 is a schematic diagram in which reinforcement learning is used to solve a Markov decision process in a conventional technology.
Figure 3:
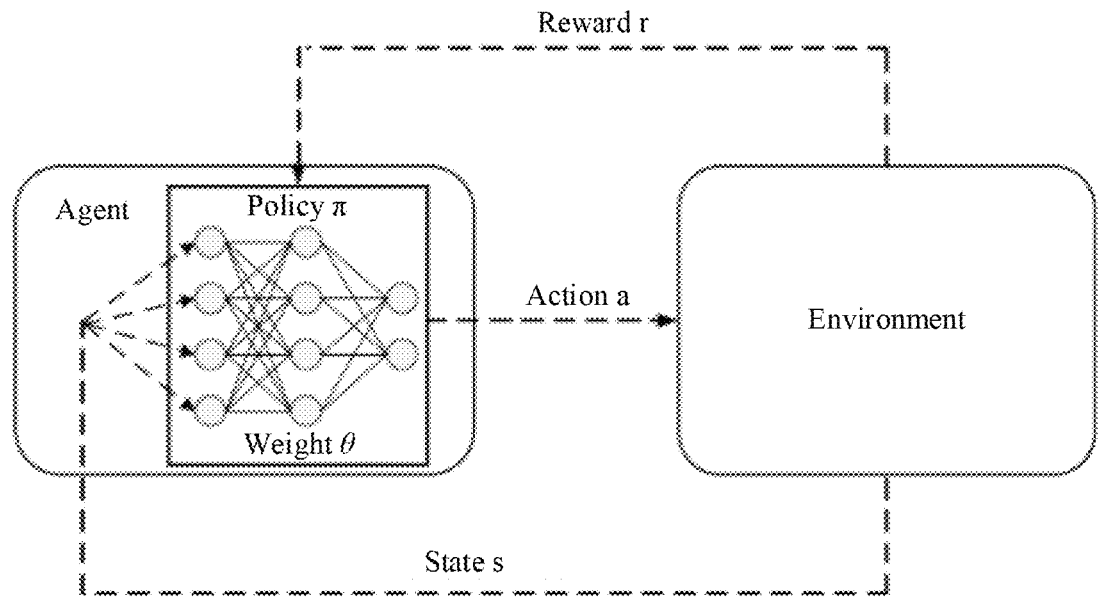
FIG. 3 is a schematic diagram in which deep reinforcement learning is used to solve a Markov decision process in a conventional technology.
Figure 4:
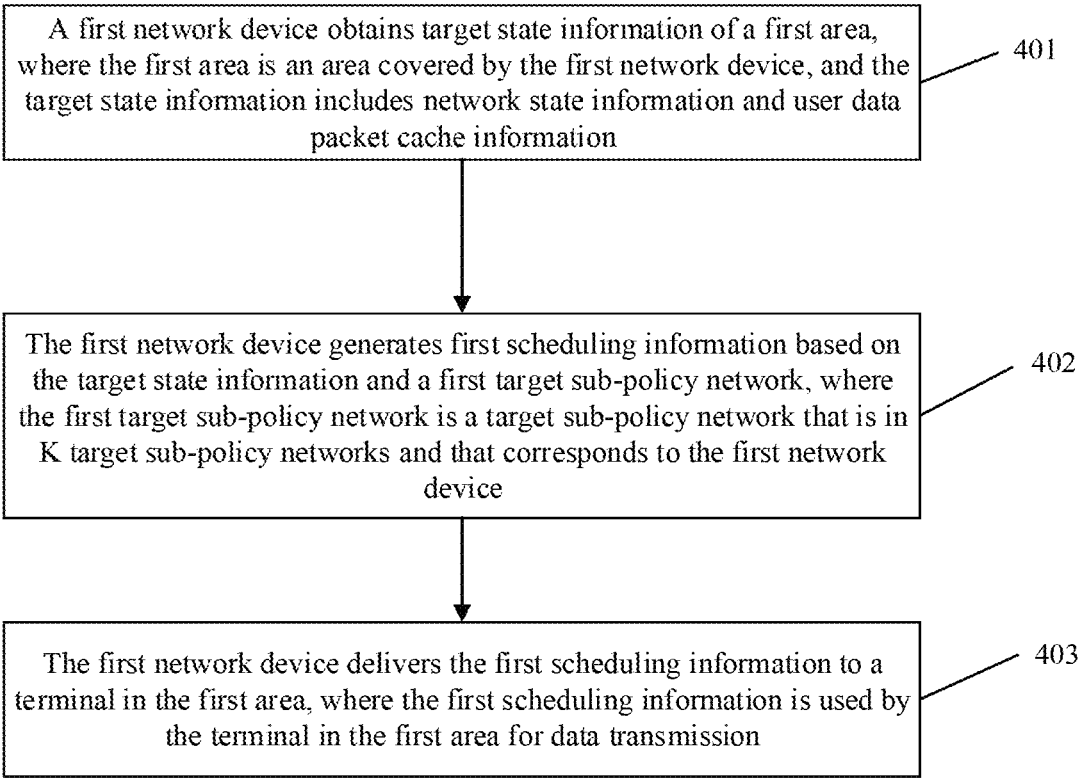
FIG. 4 is a schematic flowchart of a scheduling method according to an embodiment of this disclosure.

FIG. 4 is a schematic flowchart of a scheduling method according to an embodiment of this disclosure. The scheduling method is applied to a scheduling control system, the scheduling control system includes K network devices, and K is an integer greater than 1. As shown in FIG. 4, the method includes steps 401 to 403 that are specifically as follows:

401. A first network device obtains target state information of a first area, where the first network device is any one of the K network devices, the first area is an area covered by the first network device, and the target state information includes network state information and user data packet cache information.

The K network devices may be K base stations. The base station may be an apparatus that is deployed in a radio access network to provide a wireless communication function for a mobile station (MS). The base station may be macro base stations, micro base stations (also referred to as small cells), relay nodes, access points, and the like in various forms. A device with a base station function may have different names in systems that use different radio access technologies. For example, in an LTE system, the device is referred to as an evolved NodeB (eNB or eNodeB); and in a 3rd Generation (3G) system, the device is referred to as a NodeB. For ease of description, in all the embodiments of this disclosure, the foregoing apparatuses that provide a wireless communication function for the MS are collectively referred to as base stations. The MS may include various handheld devices, vehicle-mounted devices, wearable devices, and computing devices that have a wireless communication function, or another processing device connected to a wireless modem. The MS may also be referred to as a terminal, or may be a subscriber unit, a cellular phone, a smartphone, a wireless data card, a personal digital assistant (PDA) computer, a tablet computer, a wireless modem, a handset, a laptop computer, a machine type communication (MTC) terminal, or the like.

The first network device may be any one of the K network devices. For example, the first network device may be a base station A, and the first area is an area covered by the base station A.

The target state information may be state information of each terminal user in a cell covered by the first network device. Alternatively, when there is one macro base station, a plurality of picocell base stations, a plurality of femto base stations, and the like in a cell covered by a base station, the target state information may be state information of registered user in a coverage area of any base station in the macro base stations, the picocell base stations, or the femto base stations.

The target state information includes network state information, user data packet cache information, and the like. The network state information includes channel state information, throughput information, hybrid automatic repeat request (HARQ) information, and the like. The user data packet cache information includes a quantity of data packets in a cache, a size of the data packet in the cache, a delay of the data packet in the cache, and the like.

402. The first network device generates first scheduling information based on the target state information of the first area and a first target sub-policy network, where the first target sub-policy network is a target sub-policy network that is in K target sub-policy networks and that corresponds to the first network device, and the K target sub-policy networks are in a one-to-one correspondence with the K network devices.

For example, the first scheduling information may be information indicating a data sending manner of a first terminal in the first area. The data sending manner is a specific configuration such as a radio resource, a modulation and coding scheme, or a precoding policy that is used during data sending.

The first scheduling information is generated by the first network device based on the target state information of the first area and the first target sub-policy network.

Optionally, the first network device may input the target state information of the first area into the first target sub-policy network for processing, and processes an output result of the first target sub-policy network to obtain the first scheduling information.

Figure 5:
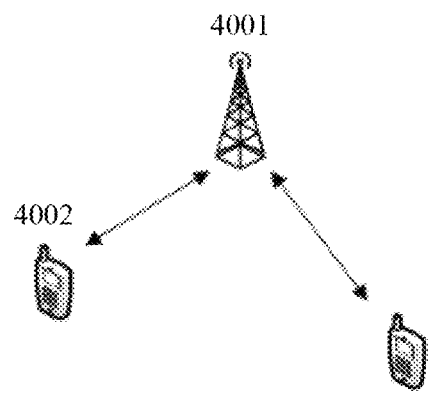
FIG. 5 is a schematic diagram of an application scenario of a scheduling method according to an embodiment of this disclosure.

An actor-critic algorithm is a commonly used reinforcement learning algorithm. As shown in FIG. 5, in a reinforcement learning architecture in which the actor-critic algorithm is used, an agent includes two parts: an actor and a critic. The actor is responsible for making a decision based on a state of an environment and an output of the critic, and the critic is responsible for evaluating, based on the state of the environment and a reward, the decision made by the actor. In deep reinforcement learning, both the actor and the critic may be implemented by using a deep neural network. In this case, the actor neural network is responsible for making a decision, and therefore is also referred to as a policy network. The critic neural network outputs an evaluation, and is also referred to as a value network.

The scheduling control system includes K network devices. Each network device corresponds to one target sub-policy network. The first network device corresponds to the first target sub-policy network. For example, one target sub-policy network is deployed on each network device. The first target sub-policy network is deployed on the first network device.

(1) Before step 402, in a first implementation, the method further includes:

The first network device performs iterative training on a first initial sub-policy network to obtain the first target sub-policy network.

The first target sub-policy network may be obtained through training based on a target value network.

That the first network device performs iterative training on a first initial sub-policy network to obtain the first target sub-policy network includes:

The first network device obtains a performance parameter based on target state information $S_{i+1}$ of the first area; and when a value of the performance parameter is not less than a preset value, the first network device determines a first sub-policy network $W_i$ as the first target sub-policy network, where i is a positive integer, the target state information $S_{i+1}$ of the first area is obtained by the terminal in the first area through data transmission based on second scheduling information, the second scheduling information is generated by the first network device based on target state information $S_i$ of the first area and the first sub-policy network $W_i$, and when i=1, the first sub-policy network $W_i$ is the first initial sub-policy network.

The foregoing is described by using an example in which current training is an $i^{th}$ time of training.

Specifically, that the first network device performs iterative training on a first initial sub-policy network to obtain the first target sub-policy network includes:

S1. The first network device obtains the target state information $S_i$ of the first area, where i is a positive integer.

S2. The first network device inputs the target state information $S_i$ into the first sub-policy network $W_i$ for processing, and processes an output result of the first sub-policy network $W_i$ to obtain the second scheduling information.

S3. The first network device delivers the second scheduling information to the terminal in the first area, where the second scheduling information is used by the terminal in the first area for data transmission.

S4. The first network device obtains the target state information $S_{i+1}$ of the first area, where the target state information $S_{i+1}$ is obtained by the terminal in the first area through data transmission based on the second scheduling information.

S5. The first network device obtains the performance parameter based on the target state information $S_{i+1}$ of the first area; when the value of the performance parameter is less than the preset value, the first network device adjusts a parameter of the first sub-policy network $W_i$ based on the target state information $S_i$, the output result of the first sub-policy network $W_i$, the target state information $S_{i+1}$, and an evaluation value of the first sub-policy network $W_i$, to obtain a first sub-policy network $W_{i+1}$ used for next training, where the evaluation value of the first sub-policy network $W_i$ is obtained through processing based on a value network $Q_i$, and the value network $Q_i$ is obtained based on a value network $Q_{i-1}$ that is previously trained; and the first network device lets i=i+1, and repeatedly performs S1 to S5; or when the value of the performance parameter is not less than the preset value, the first network device determines the first sub-policy network $W_i$ as the first target sub-policy network.

When i=1, the first sub-policy network $W_i$ is the first initial sub-policy network.

The foregoing is described by using an example in which current training is an $i^{th}$ time of training. The previous training is an $(i-1)^{th}$ time of training. The next training is an $(i+1)^{th}$ time of training.

In this embodiment, training is stopped when the value of the performance parameter is not less than the preset value. Certainly, the foregoing condition is not limited in this embodiment of this disclosure. In this embodiment of this disclosure, alternatively, training may be stopped when the value of the performance parameter is not greater than the preset value. For example, a new preset value is obtained by inverting the foregoing preset value.

In a second solution of the first implementation, that the first network device performs iterative training on a first initial sub-policy network to obtain the first target sub-policy network includes:

The first network device performs M times of iterative training on the first initial sub-policy network to obtain the first target sub-policy network, where M is a positive integer.

When performing an $i^{th}$ time of iterative training, the first network device obtains the target state information $S_i$ of the first area, where i is a positive integer.

The first network device inputs the target state information $S_i$ into the first sub-policy network $W_i$ for processing, and processes an output result of the sub-policy network $W_i$ to obtain the second scheduling information.

The first network device delivers the second scheduling information to the terminal in the first area, where the second scheduling information is used by the terminal in the first area for data transmission.

The first network device obtains the target state information $S_{i+1}$ of the first area, where the target state information $S_{i+1}$ is obtained by the terminal in the first area through data transmission based on the second scheduling information.

The first network device adjusts a parameter of the first sub-policy network $W_i$ based on the target state information $S_i$, the output result of the first sub-policy network $W_i$, the target state information $S_{i+1}$, and an evaluation value of the first sub-policy network $W_i$, to obtain a first sub-policy network $W_{i+1}$ used for next training, where the evaluation value of the first sub-policy network $W_i$ is obtained through processing based on a value network $Q_i$, and the value network $Q_i$ is obtained based on a value network $Q_{i-1}$ that is previously trained.

When i=M, the first sub-policy network $W_{i+1}$ is the first target sub-policy network. When i=1, the first sub-policy network $W_i$ is the first initial sub-policy network.

In this embodiment, training is stopped when a quantity of times of iterative training reaches a preset quantity of times. Certainly, the foregoing condition is not limited in this embodiment of this disclosure. In this embodiment of this disclosure, alternatively, training may be stopped when a quantity of times of parameter update reaches a preset quantity of times, or the like. This is not specifically limited herein.

In a third solution of the first implementation, that the first network device performs iterative training on a first initial sub-policy network to obtain the first target sub-policy network includes:

A1. The first network device obtains the target state information $S_i$ of the first area, where i is a positive integer.

A2. The first network device inputs the target state information $S_i$ into the first sub-policy network $W_i$ for processing, and processes an output result of the first sub-policy network $W_i$ to obtain the second scheduling information.

A3. The first network device delivers the second scheduling information to the terminal in the first area, where the second scheduling information is used by the terminal in the first area for data transmission.

A4. The first network device obtains the target state information $S_{i+1}$ of the first area, where the target state information $S_{i+1}$ is obtained by the terminal in the first area through data transmission based on the second scheduling information.

A5. The first network device adjusts a parameter of the first sub-policy network $W_i$ based on the target state information $S_i$, the output result of the first sub-policy network $W_i$, the target state information $S_{i+1}$, and an evaluation value of the first sub-policy network $W_i$, to obtain a first sub-policy network $W_{i+1}$ used for next training, where the evaluation value of the first sub-policy network $W_i$ is obtained through processing based on a value network $Q_i$, and the value network $Q_i$ is obtained based on a value network $Q_{i-1}$ that is previously trained.

A6. The first network device obtains a loss function corresponding to the first sub-policy network $W_{i+1}$; and when a value of the loss function corresponding to the first sub-policy network $W_{i+1}$ is not less than a preset threshold, the first network device lets i=i+1, and repeatedly performs A1 to A6; or when the value of the loss function corresponding to the first sub-policy network $W_{i+1}$ is less than the preset threshold, the first network device determines the first sub-policy network $W_{i+1}$ as the first target sub-policy network.

When i=1, the first sub-policy network $W_i$ is the first initial sub-policy network.

In this embodiment, training is stopped when a value of a loss function corresponding to a policy network is less than a preset threshold. Certainly, in this embodiment of this disclosure, alternatively, training may be stopped when a value of a loss function corresponding to a policy network is greater than a preset threshold, or the like. This is not specifically limited herein.

In various solutions of the first implementation, the evaluation value of the first sub-policy network $W_i$ is obtained by inputting, into the value network $Q_i$ for processing, target state information (including target state information $S_i$ and target state information $S_{i+1}$) of K areas covered by the K network devices, output results of K sub-policy networks corresponding to the K network devices, and feedback rewards corresponding to the K areas. The feedback rewards corresponding to the K areas are determined by terminals in the K areas through data transmission based on second scheduling information respectively corresponding to the K areas.

(2) Before step 402, in a second implementation, the method further includes:

The first network device performs iterative training on a first initial sub-policy network to obtain the first target sub-policy network.

The first target sub-policy network may be obtained through training based on a first target sub-value network. The K network devices correspond to K target sub-value networks. The first network device corresponds to the first target sub-value network.

That the first network device performs iterative training on a first initial sub-policy network to obtain the first target sub-policy network includes:

The first network device obtains a performance parameter based on target state information $S_{i+1}$ of the first area; and when a value of the performance parameter is not less than a preset value, the first network device determines a first sub-policy network $W_i$ as the first target sub-policy network, where i is a positive integer, the target state information $S_{i+1}$ of the first area is obtained by the terminal in the first area through data transmission based on second scheduling information, the second scheduling information is generated by the first network device based on target state information $S_i$ of the first area and the first sub-policy network $W_i$, and when i=1, the first sub-policy network $W_i$ is the first initial sub-policy network.

The foregoing is described by using an example in which current training is an $i^{th}$ time of training.

Specifically, that the first network device performs iterative training on a first initial sub-policy network to obtain the first target sub-policy network includes:

S6. The first network device obtains the target state information $S_i$ of the first area, where i is a positive integer.

S7. The first network device inputs the target state information $S_i$ into the first sub-policy network $W_i$ for processing, and processes an output result of the first sub-policy network $W_i$ to obtain the second scheduling information.

S8. The first network device delivers the second scheduling information to the terminal in the first area, where the second scheduling information is used by the terminal in the first area for data transmission.

S9. The first network device obtains the target state information $S_{i+1}$ of the first area, where the target state information $S_{i+1}$ is obtained by the terminal in the first area through data transmission based on the second scheduling information.

S10. The first network device obtains the performance parameter based on the target state information $S_{i+1}$ of the first area; when the value of the performance parameter is less than the preset value, the first network device adjusts a parameter of the first sub-policy network $W_i$ based on the target state information $S_i$, the output result of the first sub-policy network $W_i$, the target state information $S_{i+1}$, and an evaluation value of the first sub-policy network $W_i$, to obtain a first sub-policy network $W_{i+1}$ used for next training, where the evaluation value of the first sub-policy network $W_i$ is obtained through processing based on a first sub-value network $q_i$, the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices; the first network device lets i=i+1, and repeatedly performs S6 to S10; or when the value of the performance parameter is not less than the preset value, the first network device determines the first sub-policy network $W_i$ as the first target sub-policy network.

When i=1, the first sub-policy network $W_i$ is the first initial sub-policy network.

The foregoing is described by using an example in which current training is an $i^{th}$ time of training. The previous training is an $(i-1)^{th}$ time of training. The next training is an $(i+1)^{th}$ time of training.

In this embodiment, training is stopped when the value of the performance parameter is not less than the preset value. Certainly, the foregoing condition is not limited in this embodiment of this disclosure. In this embodiment of this disclosure, alternatively, training may be stopped when the value of the performance parameter is not greater than the preset value. For example, a new preset value is obtained by inverting the foregoing preset value.

In a second solution of the second implementation, that the first network device performs iterative training on a first initial sub-policy network to obtain the first target sub-policy network includes:

The first network device performs M times of iterative training on the first initial sub-policy network to obtain the first target sub-policy network, where M is a positive integer.

When performing an $i^{th}$ time of iterative training, the first network device obtains the target state information $S_i$ of the first area, where i is a positive integer.

The first network device inputs the target state information $S_i$ into the first sub-policy network $W_i$ for processing, and processes an output result of the sub-policy network $W_i$ to obtain the second scheduling information.

The first network device delivers the second scheduling information to the terminal in the first area, where the second scheduling information is used by the terminal in the first area for data transmission.

The first network device obtains the target state information $S_{i+1}$ of the first area, where the target state information $S_{i+1}$ is obtained by the terminal in the first area through data transmission based on the second scheduling information.

The first network device adjusts a parameter of the first sub-policy network $W_i$ based on the target state information $S_i$, the output result of the first sub-policy network $W_i$, the target state information $S_{i+1}$, and an evaluation value of the first sub-policy network $W_i$, to obtain a first sub-policy network $W_{i+1}$ used for next training, where the evaluation value of the first sub-policy network $W_i$ is obtained through processing based on a first sub-value network $q_i$, the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

When i=M, the first sub-policy network $W_{i+1}$ is the first target sub-policy network. When i=1, the first sub-policy network $W_i$ is the first initial sub-policy network.

In this embodiment, training is stopped when a quantity of times of iterative training reaches a preset quantity of times. Certainly, the foregoing condition is not limited in this embodiment of this disclosure. In this embodiment of this disclosure, alternatively, training may be stopped when a quantity of times of parameter update reaches a preset quantity of times, or the like. This is not specifically limited herein.

In a third solution of the second implementation, that the first network device performs iterative training on a first initial sub-policy network to obtain the first target sub-policy network includes:

B1. The first network device obtains the target state information $S_i$ of the first area, where i is a positive integer.

B2. The first network device inputs the target state information $S_i$ into the first sub-policy network $W_i$ for processing, and processes an output result of the first sub-policy network $W_i$ to obtain the second scheduling information.

B3. The first network device delivers the second scheduling information to the terminal in the first area, where the second scheduling information is used by the terminal in the first area for data transmission.

B4. The first network device obtains the target state information $S_{i+1}$ of the first area, where the target state information $S_{i+1}$ is obtained by the terminal in the first area through data transmission based on the second scheduling information.

B5. The first network device adjusts a parameter of the first sub-policy network $W_i$ based on the target state information $S_i$, the output result of the first sub-policy network $W_i$, the target state information $S_{i+1}$, and an evaluation value of the first sub-policy network $W_i$, to obtain a first sub-policy network $W_{i+1}$ used for next training, where the evaluation value of the first sub-policy network $W_i$ is obtained through processing based on a first sub-value network $q_i$, the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

B6. The first network device obtains a loss function corresponding to the first sub-policy network $W_{i+1}$; and when a value of the loss function corresponding to the first sub-policy network $W_{i+1}$ is not less than a preset threshold, the first network device lets i=i+1, and repeatedly performs B1 to B6; or when the value of the loss function corresponding to the first sub-policy network $W_{i+1}$ is less than the preset threshold, the first network device determines the first sub-policy network $W_{i+1}$ as the first target sub-policy network.

When i=1, the first sub-policy network $W_i$ is the first initial sub-policy network.

In this embodiment, training is stopped when a value of a loss function corresponding to a policy network is less than a preset threshold. Certainly, in this embodiment of this disclosure, alternatively, training may be stopped when a value of a loss function corresponding to a policy network is greater than a preset threshold, or the like. This is not specifically limited herein.

In various solutions of the second implementation, the evaluation value of the first sub-policy network $W_i$ is obtained by inputting, into the first sub-value network $q_i$ for processing, the target state information $S_i$ and the target state information $S_{i+1}$ of the first area covered by the first network device, the output result of the first sub-policy network $W_i$ corresponding to the first network device, a feedback reward corresponding to the first area, and information about K−1 sub-value networks other than the first sub-value network $q_i$. The feedback reward corresponding to the first area is determined by the terminal in the first area through data transmission based on the second scheduling information corresponding to the first area.

(3) Before step 402, in a third implementation, the method further includes:

The first network device receives a parameter that is of the first target sub-policy network and that is sent by a centralized network element device, where parameters of the K target sub-policy networks are the same.

The scheduling control system further includes the centralized network element device. The first network device may receive the parameter that is of the first target sub-policy network and that is sent by the centralized network element device, so that the first network device inputs the target state information of the first area into the first target sub-policy network for processing, and processes the output result of the first target sub-policy network to obtain the first scheduling information.

The centralized network element device is a core network device or a base station centralized unit (CU) device. The core network device may be a core network device in 4G communication or 5G communication, or may be a core network device in a future communication network. A generation of a communication technology or an application field of the core network device or the base station that implements the technical solution is not limited in this disclosure. The base station centralized unit (CU) device may be a base station centralized unit (CU) device in 5G communication.

403. The first network device delivers the first scheduling information to the terminal in the first area, where the first scheduling information is used by the terminal in the first area for data transmission.

The scheduling method may be applied to the following scenario. For example, for a multi-cell scheduling problem in a cellular network, each cell needs to make a scheduling decision for a user in the cell. For another example, in a heterogeneous network, there are a plurality of base stations of different levels and coverage areas, for example, a macro base station macrocell, a picocell base station picocell, and a femto base station femtocell. The base station needs to make a scheduling decision for a user, in a coverage area of the base station, who is registered with the base station, and the like.

As shown in FIG. 5, a base station 4001 may obtain, from an area covered by the base station 4001, target state information of each terminal including a terminal 4002. The target state information includes network state information, user data packet cache information, and the like. Each terminal may be each terminal in a cell covered by the base station 4001. Alternatively, each terminal may be a registered terminal in a coverage area of a macro base station, a picocell base station, or a femto base station in a cell covered by a base station, or the like. The base station 4001 obtains scheduling information based on the target state information of each terminal in the area covered by the base station 4001, and the base station 4001 delivers the scheduling information to each terminal including the terminal 4002, so that each terminal transmits data based on the scheduling information.

In this embodiment of this disclosure, the first network device in the K network devices obtains the target state information of the first area, then obtains the scheduling information based on the target state information and the first target sub-policy network corresponding to the first network device, and delivers the scheduling information to the terminal in the first area, so that each terminal in the first area transmits data based on the scheduling information. In the method, each network device performs scheduling control on a policy network corresponding to the network device, to implement multi-agent scheduling control, and improve performance of the scheduling control system. In addition, feasibility of a scheduling control solution is improved by deploying policy networks in a distributed manner.

Figure 6:
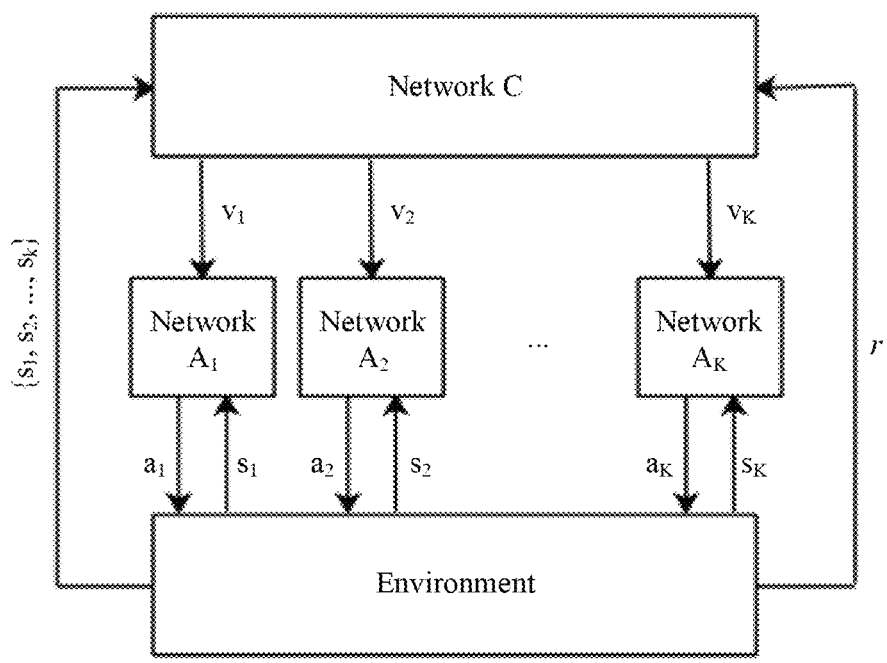
FIG. 6 is a schematic diagram of a scheduling algorithm training method applied to an architecture including a centralized value network and distributed policy networks according to an embodiment of this disclosure.

The following describes in detail a scheduling algorithm training method. FIG. 6 shows a scheduling algorithm training method according to an embodiment of this disclosure. The method is applied to a scheduling algorithm training system. The scheduling algorithm training system provides a multi-agent reinforcement learning (MARL) architecture including a centralized value network (network C) and distributed policy networks (networks A). One target value network and K target sub-policy networks may be obtained through training by using the architecture. The K target sub-policy networks are in a one-to-one correspondence with K network devices. The K network devices may implement the foregoing scheduling based on the obtained corresponding target sub-policy networks.

The centralized value network may be deployed on a centralized network element device. The centralized network element device may be a core network device or a base station centralized unit (CU) device. The distributed sub-policy network may be deployed on a base station distributed unit (DU) device.

On a basis that the centralized value network may be deployed on the centralized network element device, this embodiment of this disclosure provides a scheduling algorithm training method. The method includes steps 601 and 602 that are specifically as follows:

601. The centralized network element device obtains training data.

602. The centralized network element device performs iterative training on an initial value network based on the training data, to obtain a target value network.

Based on different termination conditions of the foregoing iterative training, the foregoing method may include at least three implementations.

In a first implementation, the training data includes target state information $S_i$ of each of K areas covered by the K network devices, the K areas are in a one-to-one correspondence with the K network devices, K is an integer greater than 1, i is a positive integer, and that the centralized network element device performs iterative training on an initial value network based on the training data, to obtain a target value network includes:

S11. The centralized network element device obtains target state information $S_{i+1}$ of each of the K areas covered by the K network devices, where the target state information $S_{i+1}$ of each of the K areas is obtained by terminals in the K areas through data transmission based on second scheduling information respectively corresponding to the K areas, the second scheduling information respectively corresponding to the K areas is obtained by inputting the target state information $S_i$ of each of the K areas into K sub-policy networks $W_i$ for processing and then respectively processing output results of the K sub-policy networks $W_i$, the sub-policy network $W_i$ is obtained based on a sub-policy network $W_{i-1}$ that is previously trained, and the K sub-policy networks are in a one-to-one correspondence with the K network devices.

S12. The centralized network element device obtains a performance parameter based on the K pieces of target state information $S_{i+1}$ of the K areas; when a value of the performance parameter is less than a preset value, the centralized network element device inputs, into a value network $Q_i$ for processing, the K pieces of target state information $S_i$ of the K areas, the output results of the K sub-policy network $W_i$, the K pieces of state information $S_{i+1}$ of the K areas, and feedback rewards corresponding to the K areas, to obtain evaluation values respectively corresponding to the K sub-policy networks; the centralized network element device adjusts a parameter of the value network $Q_i$ to obtain a value network $Q_{i+1}$ used for next training; and the centralized network element device lets i=i+1, and repeatedly performs S11 and S12; or when the value of the performance parameter is not less than the preset value, the centralized network element device determines the value network $Q_i$ as the target value network.

When i=1, the value network $Q_i$ is the initial value network.

In other words, in this embodiment of this disclosure, when a system performance parameter reaches a specified threshold, iterative training is stopped, to obtain the target value network. The foregoing system performance parameter may include a throughput, fairness, a packet loss rate, a delay, and the like. Target state information may be processed to obtain the performance parameter. For example, the system performance parameter such as a throughput, fairness, a packet loss rate, and a delay is calculated based on network state information and user data packet cache information in the target state information.

In a second implementation, when a quantity of times of iterative training of the initial value network reaches a preset quantity N of times, iterative training is stopped, to obtain the target value network.

Specifically, the training data includes target state information $S_i$ of each of K areas covered by the K network devices, the K areas are in a one-to-one correspondence with the K network devices, i is a positive integer, and that the centralized network element device performs iterative training on an initial value network based on the training data, to obtain a target value network includes:

The centralized network element device performs N times of iterative training on the initial value network to obtain the target value network, where N is a positive integer.

When performing an $i^{th}$ time of iterative training, the centralized network element device obtains state information $S_{i+1}$ of each of the K areas covered by the K network devices, where the K pieces of state information $S_{i+1}$ of the K areas are obtained by terminals in the K areas through data transmission based on second scheduling information respectively corresponding to the K areas, the second scheduling information respectively corresponding to the K areas is obtained by respectively inputting the K pieces of target state information $S_i$ of the K areas into K sub-policy networks $W_i$ for processing and then respectively processing output results of the K sub-policy networks $W_i$, the sub-policy network $W_i$ is obtained based on a sub-policy network $W_{i-1}$, and the K sub-policy networks are in a one-to-one correspondence with the K network devices.

The centralized network element device inputs, into a value network $Q_i$ for processing, the state information $S_i$ of each of the K areas covered by the K network devices, the output results of the K sub-policy networks $W_i$, the target state information $S_{i+1}$ of each of the K areas covered by the K base stations, and feedback rewards corresponding to the K areas, to obtain evaluation values of the K sub-policy networks $W_i$, where the feedback rewards corresponding to the K areas are obtained by the terminals in the K areas through data transmission based on the second scheduling information respectively corresponding to the K areas.

The centralized network element device adjusts a parameter of the value network $Q_i$ to obtain a value network $Q_{i+1}$.

When i=N, the value network $Q_{i+1}$ is the target value network. When i=1, the value network $Q_i$ is the initial value network.

In a third implementation, when an obtained loss function of a value network is less than a preset threshold, iterative training is stopped, to obtain the target value network.

Specifically, the training data includes target state information $S_i$ of each of K areas covered by the K network devices, the K areas are in a one-to-one correspondence with the K network devices, i is a positive integer, and that the centralized network element device performs iterative training on an initial value network based on the training data, to obtain a target value network includes:

C1. The centralized network element device obtains target state information $S_{i+1}$ of each of the K areas covered by the K network devices, where the K pieces of target state information $S_{i+1}$ of the K areas are obtained by terminals in the K areas through data transmission based on second scheduling information respectively corresponding to the K areas, the second scheduling information respectively corresponding to the K areas is obtained by respectively inputting the K pieces of target state information $S_i$ of the K areas into K sub-policy networks $W_i$ for processing and then respectively processing output results of the K sub-policy networks $W_i$, the sub-policy network $W_i$ is obtained based on a sub-policy network $W_{i-1}$, and the K sub-policy networks are in a one-to-one correspondence with the K network devices.

C2. The centralized network element device inputs, into a value network $Q_i$ for processing, the target state information $S_i$ of each of the K areas covered by the K network devices, the output results of the K sub-policy networks $W_i$, the target state information $S_{i+1}$ of each of the K areas covered by the K base stations, and feedback rewards corresponding to the K areas, to obtain evaluation values of the K sub-policy networks $W_i$, where the feedback rewards corresponding to the K areas are obtained by the terminals in the K areas through data transmission based on the second scheduling information respectively corresponding to the K areas.

C3. The centralized network element device adjusts a parameter of the value network $Q_i$ to obtain a value network $Q_{i+1}$.

C4. The centralized network element device obtains a loss function corresponding to the value network $Q_{i+1}$; and when a value of the loss function corresponding to the value network $Q_{i+1}$ is not less than a preset threshold, the centralized network element device lets i=i+1, and repeatedly performs C1 to C4; or when the value of the loss function corresponding to the value network $Q_{i+1}$ is less than the preset threshold, the centralized network element device determines the value network $Q_{i+1}$ as the target value network.

When i=1, the value network $Q_i$ is the initial value network.

In the foregoing embodiments, the scheduling algorithm training method is described by using an example in which the centralized value network is deployed on the centralized network element device. When the distributed sub-policy network is deployed on the base station distributed unit (DU) device, an embodiment of this disclosure further provides a scheduling algorithm training method. The method is applied to a scheduling algorithm training system, the scheduling algorithm training system includes K network devices, K is an integer greater than 1, and the method includes steps 603 and 604 that are specifically as follows:

603. A first network device obtains training data, where the first network device is any one of the K network devices.

604. The first network device performs iterative training on a first initial sub-policy network based on the training data, to obtain a first target sub-policy network, where the first initial sub-policy network is an initial sub-policy network that is in K initial sub-policy networks and that corresponds to the first network device, the first target sub-policy network is a target sub-policy network that is in K target sub-policy networks and that corresponds to the first network device, and the K initial sub-policy networks and the K target sub-policy networks are respectively in a one-to-one correspondence with the K network devices.

Correspondingly, based on different termination conditions of the foregoing iterative training, the foregoing method may include at least three implementations.

For a specific implementation in which the first network device performs iterative training on the first initial sub-policy network to obtain the first target sub-policy network, refer to descriptions of the three solutions in the first implementation existing before step 402. Details are not described herein again.

Based on the target sub-policy network obtained in the foregoing embodiments, the base station may implement scheduling.

In this embodiment of this disclosure, training is performed based on a MARL architecture including a centralized value network and distributed policy networks, to obtain one target value network and a plurality of distributed target policy networks. The distributed target policy network may be used by a network device for scheduling, so that fully centralized scheduling in a single-agent DRL is avoided, and solution feasibility is improved.

As shown in FIG. 6, each network A may obtain, from an environment corresponding to a communication system, target state information of an area corresponding to the network A. Each network A may obtain a decision action a based on the target state information s. After performing each decision action a, the environment feeds back a reward r to the network C. The network C obtains total target state information of the environment and a next-moment global state, and determines, based on the feedback reward r and each decision action a, an evaluation value v corresponding to each network A. In the foregoing architecture, for example, a policy network $A_k$ corresponding to a base station K obtains, from the environment, target state information $s_k$ corresponding to an area covered by the base station K, and the value network C obtains a current global state from the environment, namely, $(s_1, s_2, \ldots, s_k)$. The policy network $A_k$ makes a decision $a_k$. After implementing decisions made by all policy networks, the environment feeds back a reward r to the value network. The value network outputs an evaluation value v of each policy network based on the current global state s, the action a of each policy network, the feedback reward r, and the next-moment global state s', and updates a parameter of the value network. The next-moment global state s' is global state information obtained after the environment implements the decisions made by all the policy networks. The policy network $A_k$ updates a network parameter of the policy network $A_k$ based on the current state $s_k$, the action $a_k$, a next-moment state $s_k'$, and an evaluation value $v_k$ output by the value network.

Parameters of the policy network and the value network may be updated synchronously or asynchronously. In other words, the parameters may be updated simultaneously, or only the value network or the policy network may be updated in some scheduling periods. This is not specifically limited herein.

Figure 7:
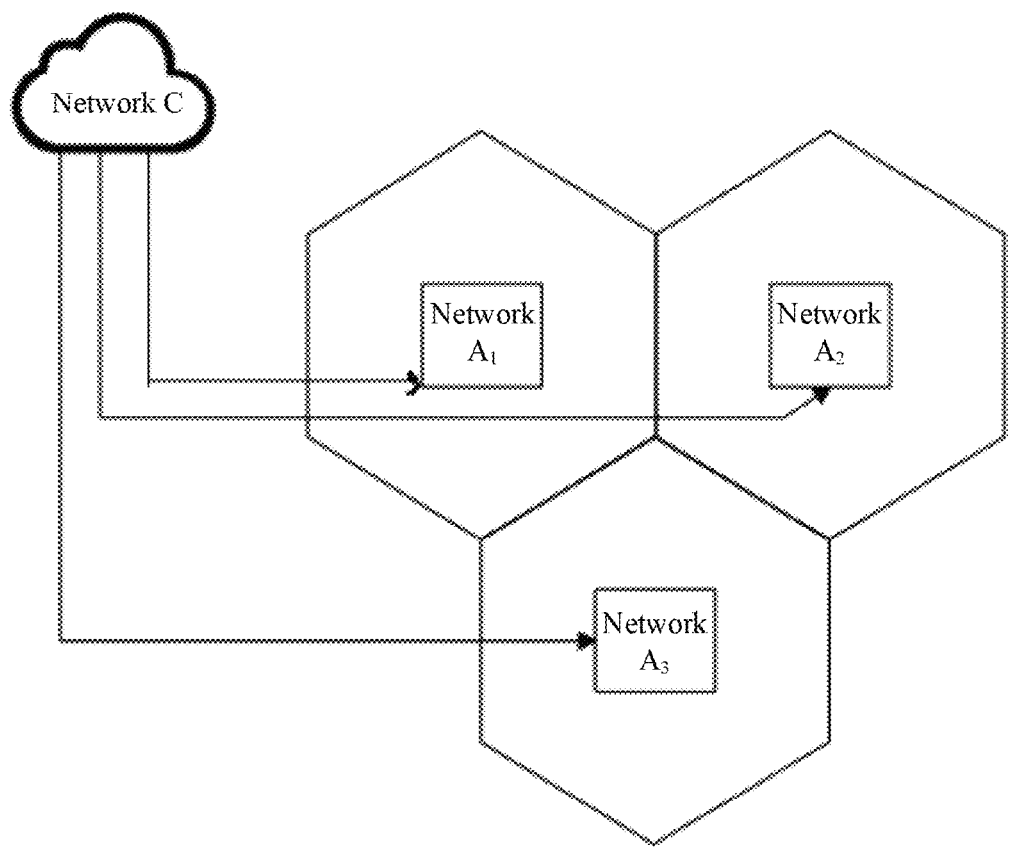
FIG. 7 is a schematic diagram of a scenario in which an architecture including a centralized value network and distributed policy networks is deployed in a multi-cell cellular network according to an embodiment of this disclosure.

For example, the foregoing MARL architecture may be deployed in a scenario of a multi-cell cellular network shown in FIG. 7. Joint scheduling of three cells is used as an example. A quantity of cells participating in joint scheduling may be set based on an inter-cell interference status, for example, a plurality of cells with severe mutual interference perform joint scheduling. As shown in FIG. 7, the centralized value network may be deployed on a core network device or a base station centralized unit (CU). The distributed policy network may be deployed on a base station distributed unit (DU). Each base station may implement scheduling control based on a corresponding target policy network.

Figure 8:
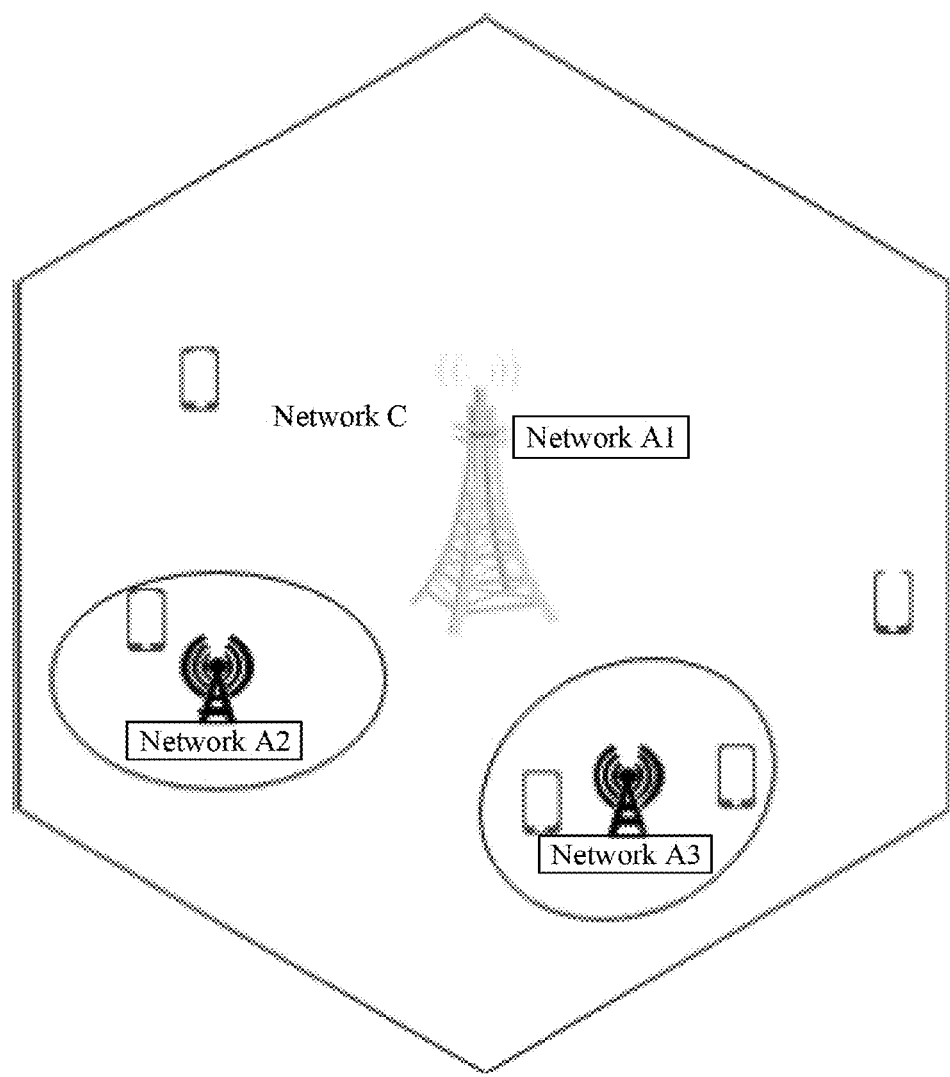
FIG. 8 is a schematic diagram of a scenario in which an architecture including a centralized value network and distributed policy networks is deployed in a heterogeneous network according to an embodiment of this disclosure.

As shown in FIG. 8, the foregoing MARL framework may be alternatively deployed in a multi-level heterogeneous network. There is one macro base station, a plurality of picocell base stations, a plurality of femto base stations, and the like in a cell in a coverage area of a macro base station. In this case, the value network may be deployed on the macro base station, and the policy network may be deployed on the macro base station, the picocell base station, and the femto base station.

Figure 9A:
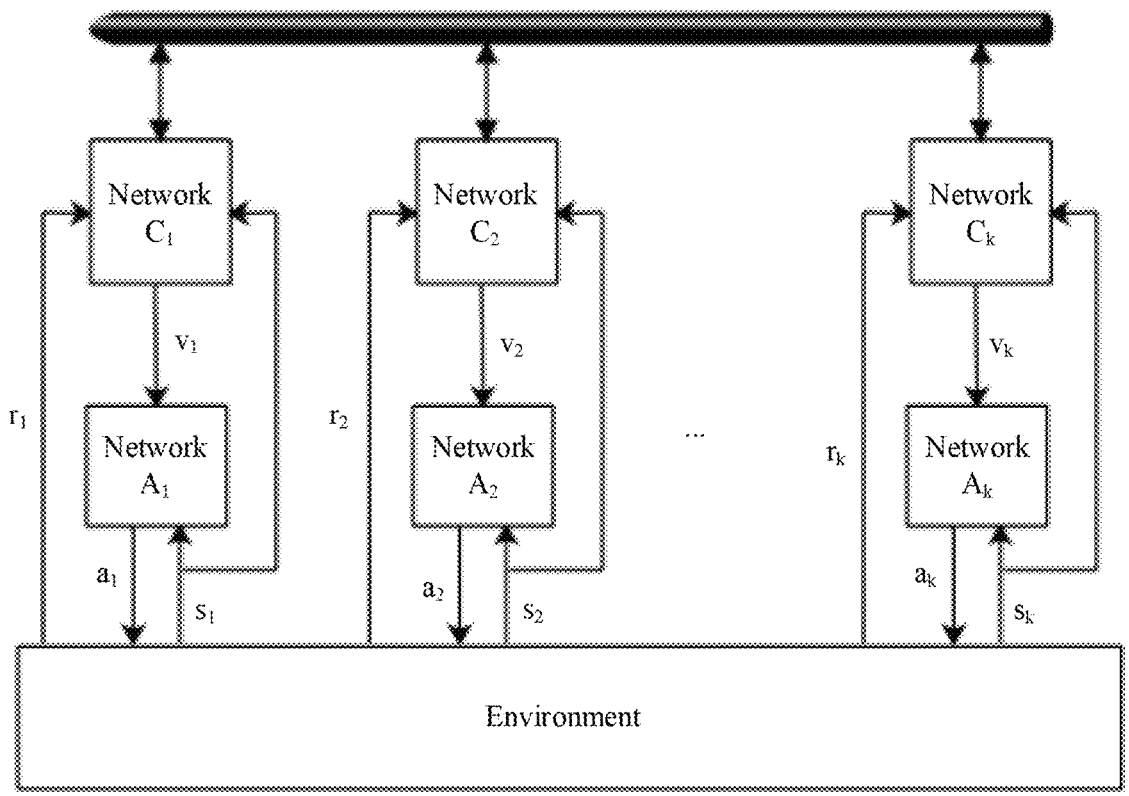
FIG. 9A is a schematic diagram of a scheduling algorithm training method applied to an architecture including distributed value networks and distributed policy networks according to an embodiment of this disclosure.
Figure 9B:
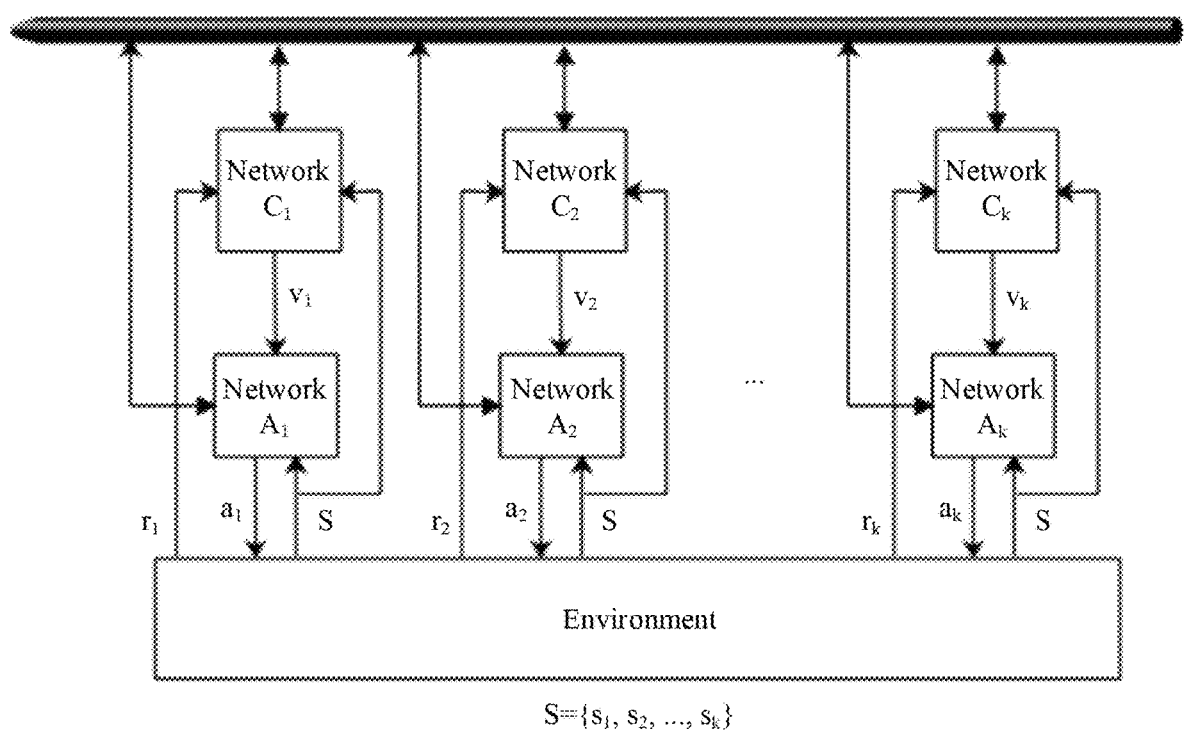
FIG. 9B is a schematic diagram of another scheduling algorithm training method applied to an architecture including distributed value networks and distributed policy networks according to an embodiment of this disclosure.

The foregoing embodiment is described by using the multi-agent reinforcement learning MARL architecture including a centralized value network and distributed policy networks. As shown in FIG. 9A and FIG. 9B, an embodiment of this disclosure further provides a multi-agent reinforcement learning (MARL) architecture including distributed value networks and distributed policy networks. The distributed value network may be deployed on a centralized network element device, and the centralized network element device may be a core network device or a base station centralized unit (CU) device. The distributed policy network may be deployed on a base station distributed unit (DU) device. K target sub-value networks and K target sub-policy networks may be obtained through training by using the architecture. The K target sub-value networks and the K target sub-policy networks are respectively in a one-to-one correspondence with K network devices.

The K network devices may implement the foregoing scheduling based on the obtained corresponding target sub-policy networks.

On a basis that the distributed value network may be deployed on the centralized network element device, this embodiment of this disclosure provides a scheduling algorithm training method. The method includes steps 901 and 902 that are specifically as follows:

901. The centralized network element device obtains training data.

902. The centralized network element device performs iterative training on a first initial sub-value network based on the training data, to obtain a first target sub-value network.

The first initial sub-value network is an initial sub-value network that is in K initial sub-value networks and that corresponds to a first network device, the first target sub-value network is a target sub-value network that is in K target sub-value networks and that corresponds to the first network device, the first network device is any one of the K network devices, and the K initial sub-value networks and the K target sub-value networks are respectively in a one-to-one correspondence with the K network devices.

Further, based on different termination conditions of the foregoing iterative training, the foregoing method may include at least three implementations.

In a first implementation, the training data includes target state information $S_i$ of a first area covered by the first network device, i is a positive integer, and that the centralized network element device performs iterative training on a first initial sub-value network based on the training data, to obtain a first target sub-value network includes:

S13. The centralized network element device obtains target state information $S_{i+1}$ of the first area, where the target state information $S_{i+1}$ of the first area is obtained by a user in the first area through data transmission based on second scheduling information corresponding to the first area, the second scheduling information corresponding to the first area is obtained by inputting the target state information $S_i$ of the first area into a first sub-policy network $W_i$ for processing and then processing an output result of the first sub-policy network $W_i$, and the first sub-policy network $W_i$ is obtained based on a first sub-policy network that is previously trained.

S14. The centralized network element device obtains a performance parameter based on the target state information $S_{i+1}$ of the first area; when a value of the performance parameter is less than a preset value, the centralized network element device inputs, into a first sub-value network $q_i$ for processing, the target state information $S_i$ of the first area, the output result of the first sub-policy network $W_i$, the target state information $S_{i+1}$, a feedback reward corresponding to the first area, and information about sub-value networks that respectively corresponds to K−1 network devices and that are other than the first sub-value network $q_i$ corresponding to the first network device, to obtain an evaluation value of the first sub-policy network $W_i$, where the feedback reward corresponding to the first area is obtained by the user in the first area through data transmission based on the second scheduling information; the centralized network element device adjusts a parameter of the first sub-value network $q_i$ to obtain a first sub-value network $q_{i+1}$ used for next training; and the centralized network element device lets i=i+1, and repeatedly performs S13 and S14; or when the value of the performance parameter is not less than the preset value, the centralized network element device determines the first sub-value network $q_i$ as the first target sub-value network.

When i=1, the first sub-value network $q_i$ is the first initial sub-value network.

In other words, in this embodiment of this disclosure, when a system performance parameter reaches a specified threshold, iterative training is stopped, to obtain the target sub-value network.

In a second implementation, when a quantity of times of iterative training of the first initial sub-value network reaches a preset quantity N of times, iterative training is stopped, to obtain the first target sub-value network.

Specifically, the training data includes state information $S_i$ of a first area covered by the first network device, i is a positive integer, and that the centralized network element device performs iterative training on a first initial sub-value network based on the training data, to obtain a first target sub-value network includes:

The centralized network element device performs N times of iterative training on the first initial sub-value network to obtain the first target sub-value network, where N is a positive integer.

When performing an $i^{th}$ time of iterative training, the centralized network element device obtains target state information $S_{i+1}$ of the first area, where the target state information $S_{i+1}$ of the first area is obtained by a terminal in the first area through data transmission based on second scheduling information corresponding to the first area, the second scheduling information corresponding to the first area is obtained by inputting the target state information $S_i$ of the first area into a first sub-policy network $W_i$ for processing and then processing an output result of the first sub-policy network $W_i$, and the first sub-policy network $W_i$ is obtained based on a first sub-policy network that is previously trained.

The centralized network element device inputs, into a first sub-value network $q_i$ for processing, the target state information $S_i$ of the first area covered by the first network device, the output result of the first sub-policy network $W_i$, the target state information a feedback reward corresponding to the first area, and information about sub-value networks that respectively correspond to K−1 network devices and that are other than the first sub-value network $q_i$ corresponding to the first network device, to obtain an evaluation value of the first sub-policy network where the feedback reward corresponding to the first area is obtained by the terminal in the first area through data transmission based on the second scheduling information.

The centralized network element device adjusts a parameter of the first sub-value network $q_i$ to obtain a first sub-value network $q_{i+1}$ used for next training.

When i=N, the first sub-value network $q_{i+1}$ is the first target sub-value network. When i=1, the first sub-value network $q_i$ is the first initial sub-value network.

In a third optional implementation, when an obtained loss function of a first sub-value network is less than a preset threshold, iterative training is stopped, to obtain the first target sub-value network. The K target sub-value networks are obtained by performing iterative training on the K initial sub-value networks respectively.

Specifically, the training data includes target state information $S_i$ of a first area covered by the first network device A, i is a positive integer, and that the centralized network element device performs iterative training on an initial sub-value network based on the training data, to obtain a target sub-value network includes:

E1. The centralized network element device obtains target state information $S_{i+1}$ of the first area, where the target state information $S_{i+1}$ of the first area is obtained by a terminal in the first area through data transmission based on second scheduling information corresponding to the first area, the second scheduling information corresponding to the first area is obtained by inputting the target state information $S_i$ of the first area into a first sub-policy network $W_i$ for processing and then processing an output result of the first sub-policy network $W_i$, and the first sub-policy network $W_i$ is obtained based on a first sub-policy network $W_{i-1}$ that is previously trained.

E2. The centralized network element device inputs, into a first sub-value network $q_i$ for processing, the target state information $S_i$ of the first area, the output result of the first sub-policy network $W_i$, the target state information $S_{i+1}$, a feedback reward corresponding to the first area, and information about sub-value networks that respectively correspond to K−1 network devices and that are other than the first sub-value network $q_i$ corresponding to the first network device, to obtain an evaluation value of the first sub-policy network $W_i$, where the feedback reward corresponding to the first area is obtained by the terminal in the first area through data transmission based on the second scheduling information.

E3. The centralized network element device adjusts a parameter of the first sub-value network $q_i$ to obtain a first sub-value network $q_{i+1}$ used for next training.

E4. The centralized network element device obtains a loss function corresponding to the first sub-value network $q_{i+1}$; and when a value of the loss function corresponding to the first sub-value network $q_{i+1}$ is not less than a preset threshold, the centralized network element device lets i=i+1, and repeatedly performs E1 to E4; or when the value of the loss function corresponding to the first sub-value network $q_{i+1}$ is less than the preset threshold, the centralized network element device determines the first sub-value network $q_{i+1}$ as the first target sub-value network.

When i=1, the first sub-value network $q_i$ is the first initial sub-value network.

In the foregoing embodiments, the scheduling algorithm training method is described by using an example in which the distributed value network is deployed on the centralized network element device. When the distributed sub-policy network is deployed on the base station distributed unit (DU) device, an embodiment of this disclosure further provides a scheduling algorithm training method. The method is applied to a scheduling algorithm training system, the scheduling algorithm training system includes K network devices, K is an integer greater than 1, and the method includes steps 903 and 904 that are specifically as follows:

903. A first network device obtains training data, where the base station A is any one of the K base stations.

904. The first network device performs iterative training on a first initial sub-policy network based on the training data, to obtain a first target sub-policy network, where the first initial sub-policy network is an initial sub-policy network that is in K initial sub-policy networks and that corresponds to the first network device, the first target sub-policy network is a target sub-policy network that is in K target sub-policy networks and that corresponds to the first network device, and the K initial sub-policy networks and the K target sub-policy networks are respectively in a one-to-one correspondence with the K network devices.

Correspondingly, based on different termination conditions of the foregoing iterative training, the foregoing method may include at least three implementations.

The training data includes target state information $S_i$ of a first area, i is a positive integer, and the first area is an area covered by the first network device.

For a specific implementation in which the first network device performs iterative training on the first initial sub-policy network based on the training data, to obtain the first target sub-policy network, refer to descriptions of the solutions in the second implementation existing before step 402. Details are not described herein again.

Based on the target sub-policy network obtained in the foregoing embodiments, the base station may implement scheduling.

The foregoing embodiment is described by using an example in which the distributed value network is deployed on the centralized network element device and the distributed policy network is deployed on the base station distributed unit device. Alternatively, both the distributed value network and the distributed policy network may be deployed on the base station distributed unit device. An embodiment of this disclosure further provides a scheduling algorithm training method. The method is applied to a scheduling algorithm training system, the scheduling algorithm training system includes K network devices, K is an integer greater than 1, and the method includes steps 905 and 906 that are specifically as follows:

905. A first network device obtains training data, where the first network device is any one of the K network devices.

906. The first network device separately performs iterative training on a first initial sub-value network and a first initial sub-policy network based on the training data, to obtain a first target sub-value network and a first target sub-policy network, where the first initial sub-value network is an initial sub-value network that is in K initial sub-value networks and that corresponds to the first network device, the first target sub-value network is a target sub-value network that is in K target sub-value networks and that corresponds to the first network device, the first initial sub-policy network is an initial sub-policy network that is in K initial sub-policy networks and that corresponds to the first network device, the first target sub-policy network is a target sub-policy network that is in K target sub-policy networks and that corresponds to the first network device, and the K initial sub-value networks, the K target sub-value networks, the K initial sub-policy networks and the K target sub-policy networks are respectively in a one-to-one correspondence with the K network devices.

The training data includes state information of a first area, the first area is an area covered by the first network device, and that the first network device separately performs iterative training on a first initial sub-value network and a first initial sub-policy network based on the training data, to obtain a first target sub-value network and a first target sub-policy network includes:

S26. The first network device inputs target state information $S_i$ of the first area into a first sub-policy network $W_i$ for processing, and processes an output result of the first sub-policy network $W_i$ to obtain second scheduling information, where i is a positive integer.

S27. The first network device obtains target state information $S_{i+1}$ of the first area, where the target state information $S_{i+1}$ is obtained by a terminal in the first area through data transmission based on the second scheduling information.

S28. The first network device obtains a performance parameter based on the target state information $S_{i+1}$; when a value of the performance parameter is less than a preset value, the first network device inputs, into a first sub-value network $q_i$ for processing, the target state information $S_i$, the output result of the first sub-policy network $W_i$, the target state information and a feedback reward, to obtain an evaluation value of the first sub-policy network $W_i$; the first network device adjusts a parameter of the first sub-value network $q_i$ to obtain a first sub-value network $q_{i+1}$ used for next training, where the feedback reward is obtained by the terminal in the first area through data transmission based on the second scheduling information; the first network device adjusts a parameter of the first sub-policy network $W_i$ based on the target state information $S_i$, the output result of the first sub-policy network $W_i$, the target state information $S_{i+1}$, and the evaluation value, to obtain a first sub-policy network $W_{i+1}$ used for next training; and the first network device lets i=i+1, and repeatedly performs S26 to S28; or when the value of the performance parameter is not less than the preset value, the first network device determines the first sub-value network $q_i$ as the first target sub-value network, and determines the first sub-policy network $W_i$ as the first target sub-policy network.

When i=1, the first sub-value network $q_i$ is the first initial sub-value network, and the first sub-policy network $W_i$ is the first initial sub-policy network.

The foregoing uses only the performance parameter as a determining condition of terminating training. For a specific processing method in which a quantity of times of training, a value of a loss function of a network, or the like is used as the determining condition of terminating training, refer to the foregoing descriptions. Details are not described herein again.

As shown in FIG. 9A, there are a plurality of distributed value networks in the architecture, and each value network individually provides an evaluation value for a corresponding policy network. The plurality of value networks are connected to each other by using a communication bus, to exchange information. In the architecture, a policy network $A_k$ obtains, from an environment, a state $s_k$ corresponding to the policy network $A_k$, and a value network $C_k$ obtains, from the environment, a state $s_k$ corresponding to the value network $C_k$. After the policy network $A_k$ makes a decision $a_k$, the environment implements decisions made by all policy networks, and feeds back a reward $r_k$ to the value network $C_k$. The value network outputs an evaluation value $v_k$ of the policy network $A_k$ based on the current state $s_k$, the action $a_k$ of the policy network, the reward $r_k$, a next-moment state $s_k'$, and information that is about another value network and that is obtained by using the communication bus, and updates a network parameter of the value network. The policy network $A_k$ updates a network parameter of the policy network $A_k$ based on the current state $s_k$, the action $a_k$, the next-moment state $s_k'$, and the evaluation value $v_k$ output by the value network. The next-moment state $s_k'$ is a state obtained after the corresponding environment implements the decision made by the policy network. The information exchanged between the plurality of value networks by using the communication bus may be a state $s_k$, an action $a_k$, or a reward $r_k$ that corresponds to each value network, or may be an output result of another value network, a parameter of the another value network, an updated gradient value of the another value network, or the like. Similarly, in the framework, parameters of the policy network and the value network may be updated synchronously or asynchronously.

Further, as shown in FIG. 9B, information may also be exchanged between the policy networks. Information about another policy network may be obtained by using the communication bus. The information about the another policy network may include an output result of the another policy network, a parameter of the another policy network, an updated gradient value of the another policy network, or the like. For example, the policy network $A_k$ may update a network parameter of the policy network $A_k$ based on the current state $s_k$, the action $a_k$, the next-moment state $s_k'$, the evaluation value $v_k$ output by the value network, and the information about the another policy network.

Figure 10:
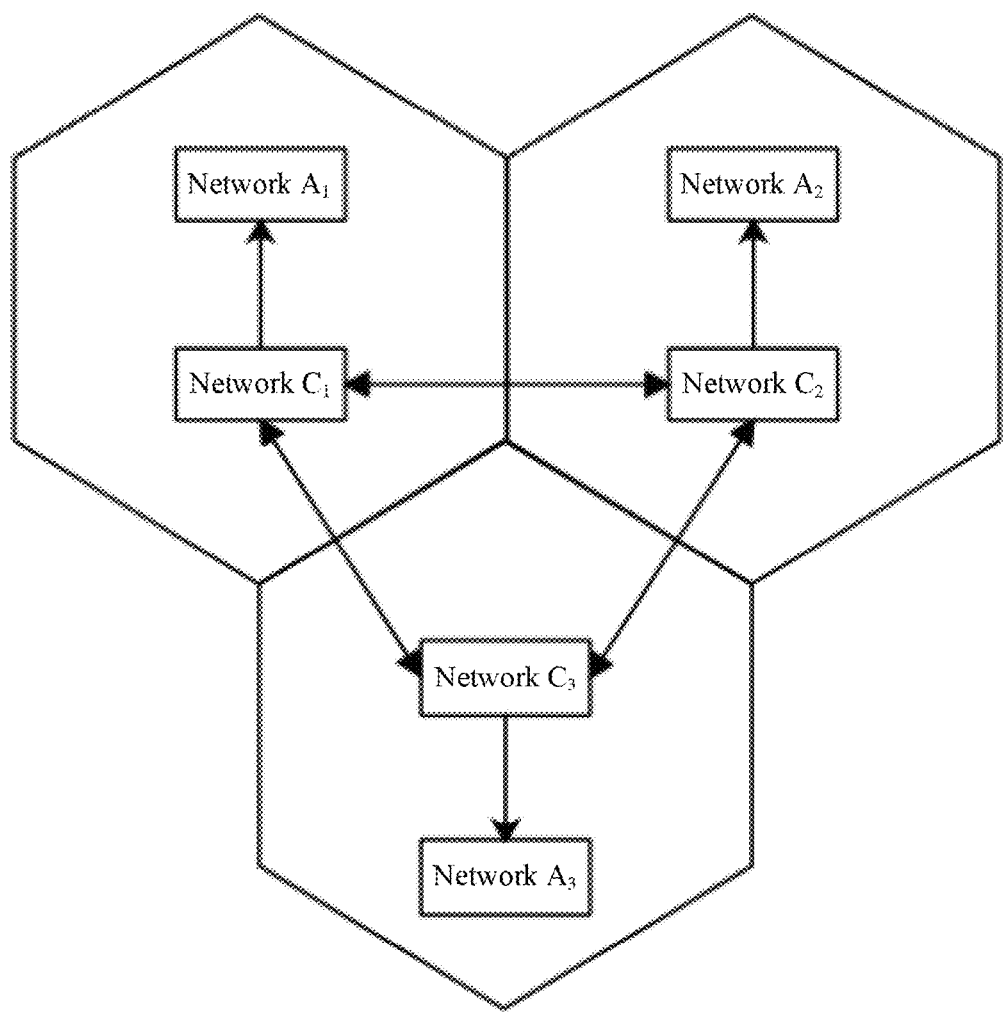
FIG. 10 is a schematic diagram of a scenario in which an architecture including distributed value networks and distributed policy networks is deployed in a multi-cell cellular network according to an embodiment of this disclosure.

As shown in FIG. 10, the foregoing MARL framework is deployed in a scenario of a multi-cell cellular network. A quantity of cells participating in joint scheduling may be set based on an inter-cell interference status, for example, a plurality of cells with severe mutual interference perform joint scheduling. Joint scheduling of three cells is used as an example. As shown in FIG. 10, both the distributed value network and the distributed policy network are deployed on a base station distributed unit (DU). Alternatively, the distributed value network may be deployed on a core network device or a base station CU. When the distributed value network is deployed on a core network device or a base station CU, this helps reduce overheads of communication between value networks.

Figure 11:
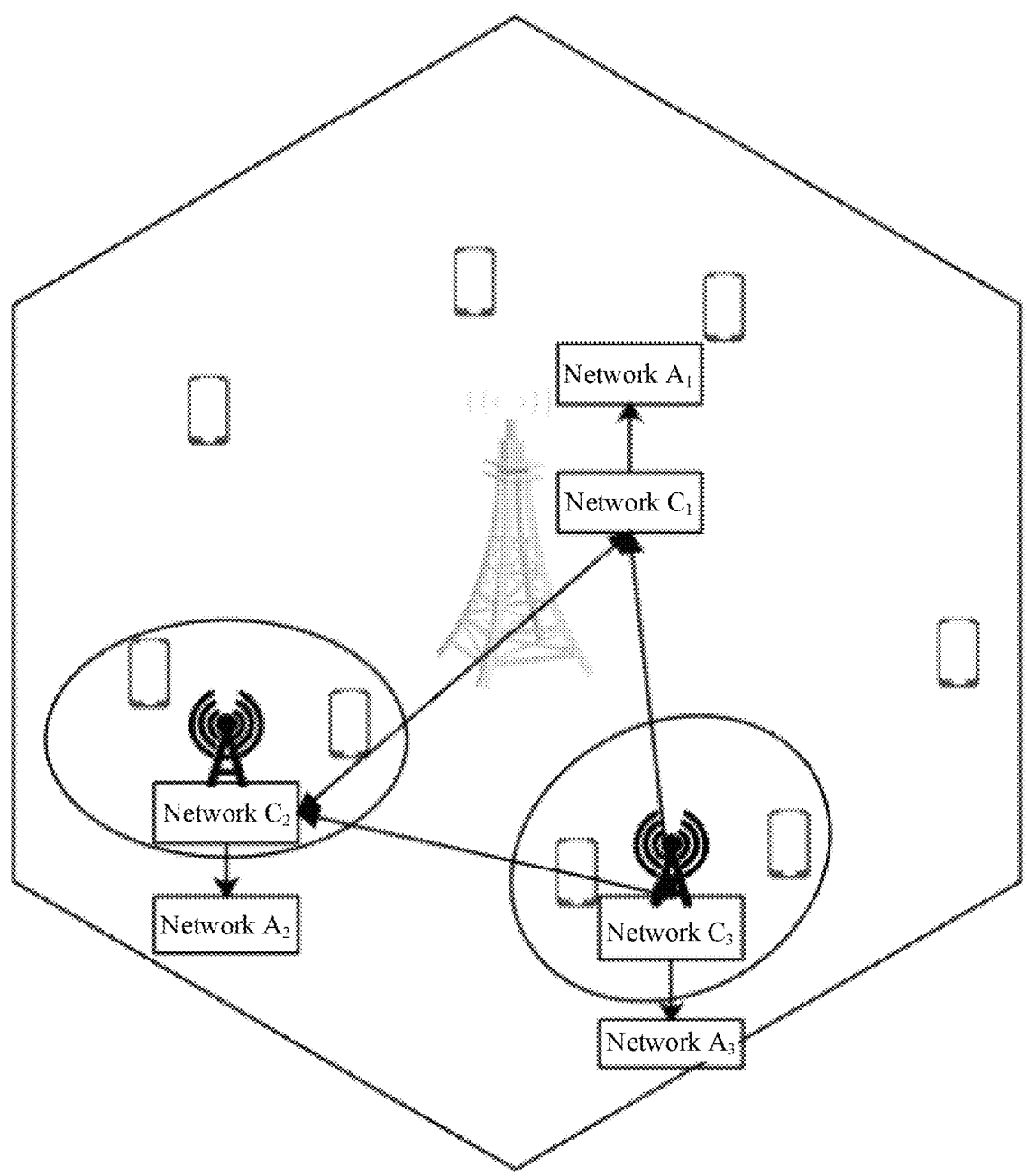
FIG. 11 is a schematic diagram of a scenario in which an architecture including distributed value networks and distributed policy networks is deployed in a heterogeneous network according to an embodiment of this disclosure.

The foregoing MARL framework corresponding to the distributed value network and the distributed policy network may be used for scheduling in a system that has a multi-level network, for example, a heterogeneous network and a cognitive radio network. The heterogeneous network is used as an example. As shown in FIG. 11, there is one macro base station, a plurality of picocell base stations, and a plurality of femto base stations in a cell in a coverage area of a macro base station. In this case, the value network and the policy network may be deployed on the macro base station, the picocell base station, and the femto base station. The plurality of distributed value networks may be deployed on the macro base station, to reduce overheads of communication between the value networks.

In this embodiment of this disclosure, training is performed based on a MARL architecture including distributed value networks and distributed policy networks, to obtain a plurality of target value networks and a plurality of distributed target policy networks. The distributed target policy network may be used by a network device for scheduling, so that fully centralized scheduling in a single-agent DRL is avoided, and solution feasibility is improved.

Figure 12:
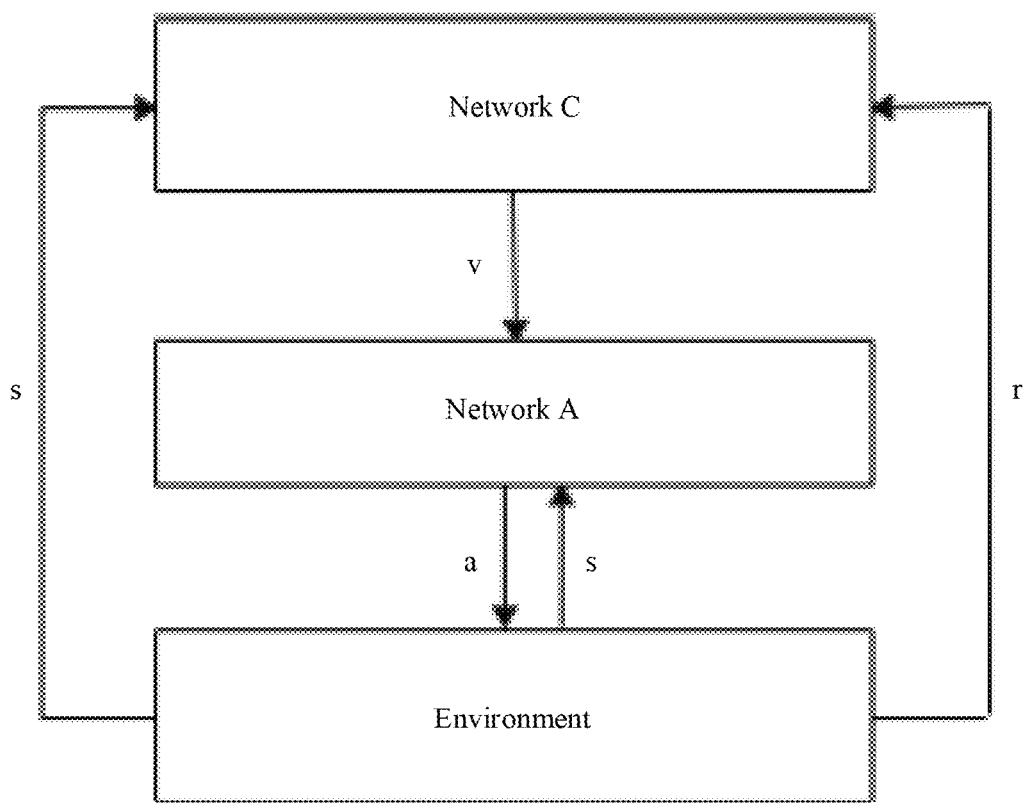
FIG. 12 is a schematic diagram of a scheduling algorithm training method applied to an architecture including a centralized value network and a centralized policy network according to an embodiment of this disclosure.

An embodiment of this disclosure further provides a multi-agent reinforcement learning (MARL) architecture including a centralized value network and a centralized policy network. As shown in FIG. 12, the architecture includes a centralized value network and a centralized policy network. A target value network and a target policy network may be obtained through training by using the architecture. After training ends, the target policy network is delivered to each base station, to complete scheduling in a distributed manner.

Both the centralized value network and the centralized policy network may be deployed on a centralized network element device such as a core network device or a base station centralized unit (CU). Therefore, this embodiment of this disclosure provides a scheduling algorithm training method. The method is applied to a scheduling algorithm training system, the scheduling algorithm training system includes a centralized network element device, and the method includes steps 1201 to 1203 that are specifically as follows:

1201. The centralized network element device obtains training data.

1202. The centralized network element device separately performs iterative training on an initial value network and an initial policy network based on the training data, to obtain a target value network and a target policy network.

The training data includes target state information $S_i$ of K areas covered by K network devices, i is a positive integer, and that the centralized network element device separately performs iterative training on an initial value network and an initial policy network based on the training data, to obtain a target value network and a target policy network includes:

S29. The centralized network element device inputs, into a policy network $w_i$ for processing, the target state information $S_i$ of the K areas covered by the K network devices, and processes an output result of the policy network $w_i$ to obtain second scheduling information.

S30. The centralized network element device obtains target state information $S_{i+1}$ of the K areas, where the target state information $S_{i+1}$ is state information obtained by terminals in the K areas through data transmission based on the second scheduling information.

S31. The centralized network element device obtains a performance parameter based on the target state information $S_{i+1}$ of the K areas; when a value of the performance parameter is less than a preset value, the centralized network element device inputs, into a value network $Q_i$ for processing, the target state information $S_i$ of the K areas, the output result of the policy network $w_i$, the target state information $S_{i+1}$, and feedback rewards, to obtain an evaluation value of the policy network $w_i$; the centralized network element device adjusts a parameter of the value network $Q_i$ to obtain a value network $Q_{i+1}$, where the feedback rewards are obtained by the terminals in the K areas through data transmission based on the second scheduling information; the centralized network element device adjusts a parameter of the policy network $w_i$ based on the target state information $S_i$ of the K areas, the output result of the policy network $w_i$, the target state information $S_{i+1}$, and the evaluation value, to obtain a policy network $w_{i+1}$; and the centralized network element device lets i=i+1, and repeatedly performs S29 to S31; or when the value of the performance parameter is not less than the preset value, the centralized network element device determines the value network $Q_i$ as the target value network, and determines the policy network $w_i$ as the target policy network.

When i=1, the value network $Q_i$ is the initial value network, and the policy network $w_i$ is the initial policy network.

The foregoing uses only the performance parameter as a determining condition of terminating training. For a specific processing method in which a quantity of times of training, a value of a loss function of a network, or the like is used as the determining condition of terminating training, refer to the foregoing descriptions. Details are not described herein again.

1203. The centralized network element device sends a parameter of the target policy network to the K network devices.

The centralized network element device may deliver the obtained target policy network to each network device, so that distributed scheduling can be implemented, fully centralized scheduling in a single-agent DRL is avoided, and solution feasibility is improved.

As shown in FIG. 12, both a centralized network A and a centralized network C obtain global target state information s. Then, the centralized network A makes a decision about an action $a_k$ for each cell in a cellular network or each level of base station in a heterogeneous network. After the action $a_k$ is performed, a system state is updated, and a reward r is fed back to the centralized network C. The centralized network C network calculates an evaluation value v for the centralized network A based on the reward r, the action $a_k$, the target state information s, and a next-moment global state s', and updates a network parameter of the centralized network C. The centralized network A and the centralized network C update respective network parameters. If a training termination condition is not met, the foregoing step is repeatedly performed. When the training termination condition is met, the centralized network A is delivered to each cell base station in the cellular network or each level of base station in the heterogeneous network. The foregoing termination condition includes: A quantity of update times of a neural network reaches a specified threshold, system performance (a throughput/fairness/a packet loss rate/a delay) reaches a specified threshold, a loss function of a neural network is less than a specified threshold, or the like.

Figure 13:
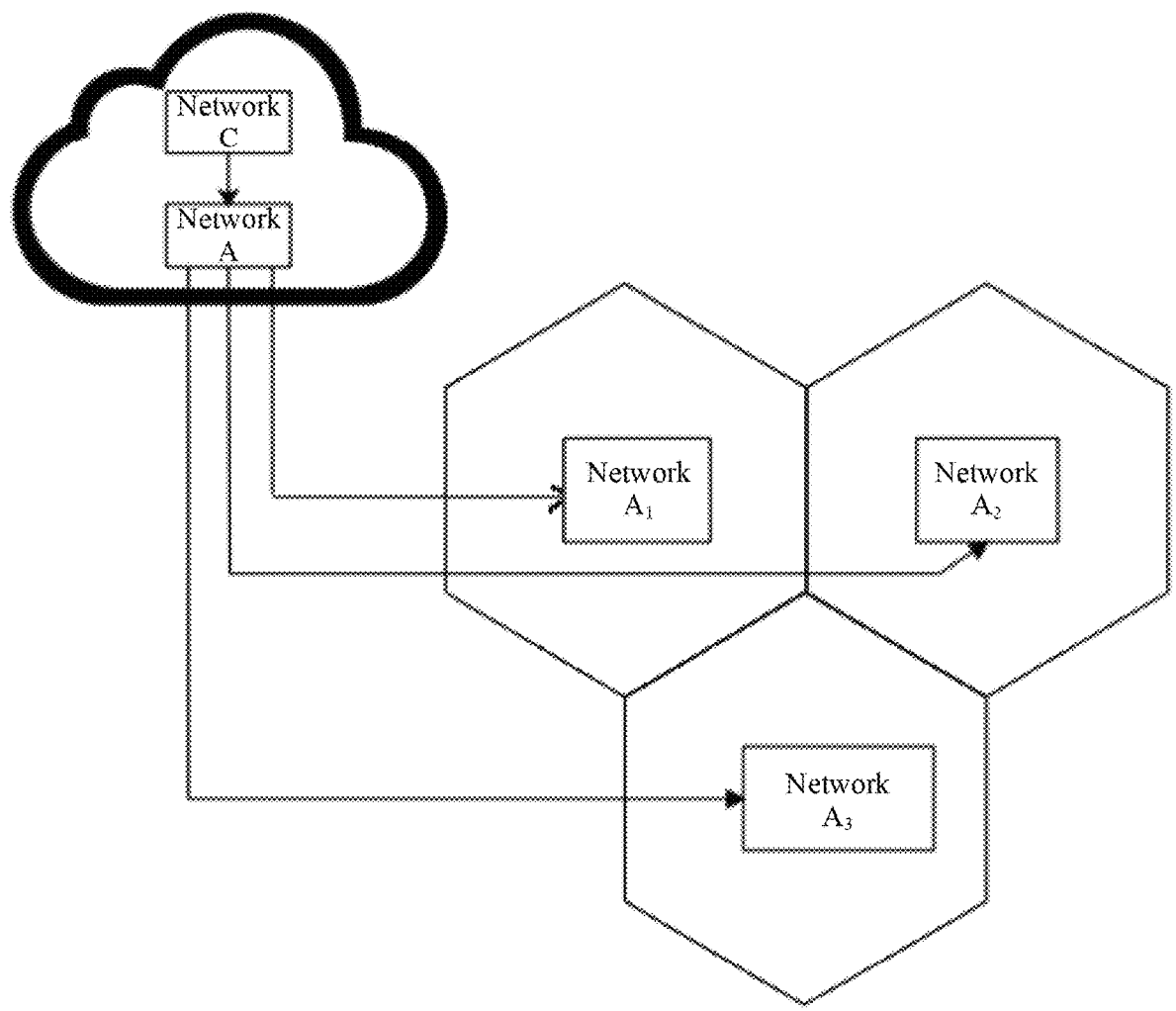
FIG. 13 is a schematic diagram of a scenario in which an architecture including a centralized value network and a centralized policy network is deployed in a multi-cell cellular network according to an embodiment of this disclosure.
Figure 14:
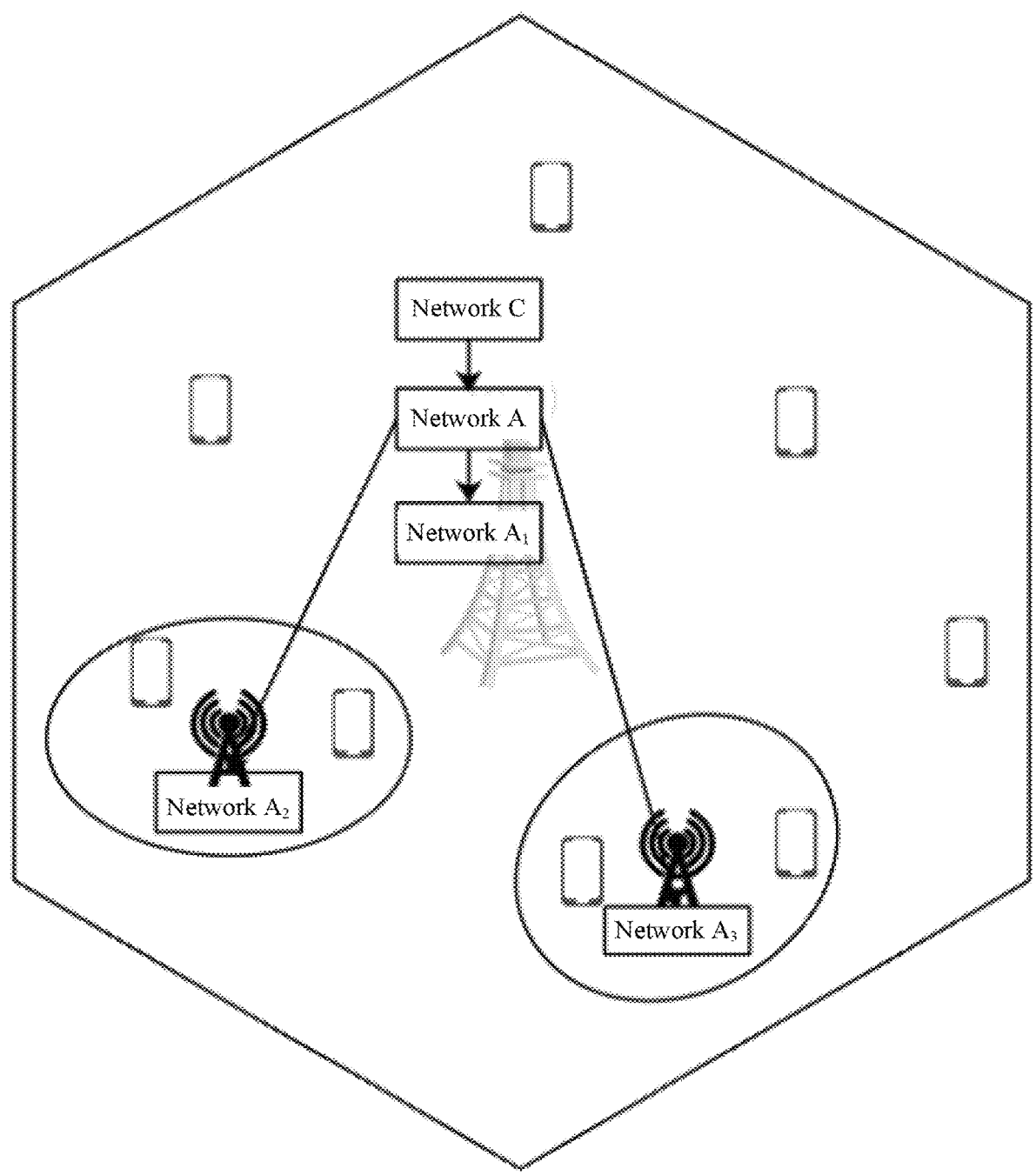
FIG. 14 is a schematic diagram of a scenario in which an architecture including a centralized value network and a centralized policy network is deployed in a heterogeneous network according to an embodiment of this disclosure.

As shown in FIG. 13, the centralized value network and the centralized policy network may be deployed on a core network device or a (CU) in a multi-cell cellular network. After the foregoing training, the centralized policy network may be copied or delivered to each cell base station for scheduling. The centralized value network and the centralized policy network may be deployed on a macro base station in a multi-level heterogeneous network. As shown in FIG. 14, after the foregoing training, the centralized policy network may be copied or delivered to each level of base station for scheduling.

Further, an embodiment of this disclosure further provides a scheduling control system, where the scheduling control system includes K network devices, K is an integer greater than 1, a first network device is any one of the K network devices, and the first network device is configured to:

obtain target state information of a first area, where the first area is an area covered by the first network device, and the target state information includes network state information and user data packet cache information;

generate first scheduling information based on the target state information of the first area and a first target sub-policy network, where the first target sub-policy network is a target sub-policy network that is in K target sub-policy networks and that corresponds to the first network device, and the K target sub-policy networks are in a one-to-one correspondence with the K network devices; and deliver the first scheduling information to a terminal in the first area, where the first scheduling information is used by the terminal in the first area for data transmission.

Before generating the first scheduling information based on the target state information of the first area and the first target sub-policy network, the first network device is further configured to:

perform iterative training on a first initial sub-policy network to obtain the first target sub-policy network; and the performing iterative training on a first initial sub-policy network to obtain the first target sub-policy network specifically includes:

obtaining a performance parameter based on target state information $S_{i+1}$ of the first area; and when a value of the performance parameter is not less than a preset value, determining a first sub-policy network $W_i$ as the first target sub-policy network, where i is a positive integer, the target state information $S_{i+1}$ of the first area is obtained by the terminal in the first area through data transmission based on second scheduling information, the second scheduling information is generated based on target state information $S_i$ of the first area and the first sub-policy network $W_i$, the target state information $S_i$ is target state information to be used in an $i^{th}$ time of training, and when i=1, the first sub-policy network $W_i$ is the first initial sub-policy network.

Further, when the value of the performance parameter is less than the preset value, the first network device is configured to:

adjust a parameter of the first sub-policy network $W_i$ based on the target state information $S_i$, an output result of the first sub-policy network $W_i$, the target state information $S_{i+1}$, and an evaluation value of the first sub-policy network $W_i$, to obtain a first sub-policy network used for next training, where the evaluation value of the first sub-policy network $W_i$ is obtained through processing based on a value network $Q_i$, and the value network $Q_i$ is obtained based on a value network that is previously trained.

Further, the evaluation value of the first sub-policy network $W_i$ is obtained by inputting, into the value network $Q_i$ for processing, target state information of K areas covered by the K network devices, output results of K sub-policy networks corresponding to the K network devices, and feedback rewards corresponding to the K areas, where the feedback rewards corresponding to the K areas are determined by terminals in the K areas through data transmission based on second scheduling information respectively corresponding to the K areas.

In another optional implementation, when the value of the performance parameter is less than the preset value, the first network device is configured to:

adjust a parameter of the first sub-policy network $W_i$ based on the target state information $S_i$, an output result of the first sub-policy network $W_i$, the target state information $S_{i+1}$, and an evaluation value of the first sub-policy network $W_i$, to obtain a first sub-policy network used for next training, where the evaluation value of the first sub-policy network $W_i$ is obtained through processing based on a first sub-value network $q_i$, the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

Further, the evaluation value of the first sub-policy network $W_i$ is obtained by inputting, into the first sub-value network $q_i$ for processing, the target state information $S_i$ and the target state information $S_{i+1}$ of the first area covered by the first network device, the output result of the first sub-policy network $W_i$ corresponding to the first network device, a feedback reward corresponding to the first area, and information about K−1 sub-value networks other than the first sub-value network $q_i$, where the feedback reward corresponding to the first area is determined by the terminal in the first area through data transmission based on the second scheduling information corresponding to the first area.

In another optional implementation, the scheduling control system further includes a centralized network element device, and before generating the first scheduling information based on the target state information of the first area and the first target sub-policy network, the first network device is further configured to:

receive a parameter that is of the first target sub-policy network and that is sent by the centralized network element device, where parameters of the K target sub-policy networks are the same, and the centralized network element device is a core network device or a base station centralized unit (CU) device.

In an aspect, an embodiment of this disclosure further provides a scheduling algorithm training system, where the scheduling algorithm training system includes K network devices, K is an integer greater than 1, a first network device is any one of the K network devices, and the first network device is configured to:

obtain training data; and perform iterative training on a first initial sub-policy network based on the training data, to obtain a first target sub-policy network, where the first initial sub-policy network is an initial sub-policy network that is in K initial sub-policy networks and that corresponds to the first network device, the first target sub-policy network is a target sub-policy network that is in K target sub-policy networks and that corresponds to the first network device, and the K initial sub-policy networks and the K target sub-policy networks are respectively in a one-to-one correspondence with the K network devices.

The training data includes target state information $S_{i+1}$ of a first area, the first area is an area covered by the first network device, and the first network device is specifically configured to:

obtain a performance parameter based on the target state information $S_{i+1}$ of the first area; and when a value of the performance parameter is not less than a preset value, determine a first sub-policy network $W_i$ as the first target sub-policy network, where i is a positive integer, the target state information $S_{i+1}$ of the first area is obtained by a terminal in the first area through data transmission based on second scheduling information, the second scheduling information is generated based on target state information $S_i$ of the first area and the first sub-policy network $W_i$, the target state information $S_i$ is target state information to be used in an $i^{th}$ time of training, and when i=1, the first sub-policy network $W_i$ is the first initial sub-policy network.

Further, when the value of the performance parameter is less than the preset value, the first network device is configured to:
  adjust a parameter of the first sub-policy network $W_i$ based on the target state information $S_i$, an output result of the first sub-policy network $W_i$, the target state information $S_{i+1}$, and an evaluation value of the first sub-policy network $W_i$, to obtain a first sub-policy network used for next training, where the evaluation value of the first sub-policy network $W_i$ is obtained through processing based on a value network $Q_i$, and the value network $Q_i$ is obtained based on a value network that is previously trained.

Further, the evaluation value of the first sub-policy network $W_i$ is obtained by inputting, into the value network $Q_i$ for processing, target state information of K areas covered by the K network devices, output results of sub-policy networks respectively corresponding to the K network devices, and feedback rewards corresponding to the K areas, where the feedback rewards corresponding to the K areas are determined by terminals in the K areas through data transmission based on second scheduling information respectively corresponding to the K areas.

In another optional implementation, when the value of the performance parameter is less than the preset value, the first network device is configured to:
  adjust a parameter of the first sub-policy network $W_i$ based on the target state information $S_i$, an output result of the first sub-policy network $W_i$, the target state information $S_{i+1}$, and an evaluation value of the first sub-policy network $W_i$, to obtain a first sub-policy network used for next training, where the evaluation value of the first sub-policy network $W_i$ is obtained through processing based on a first sub-value network $q_i$, the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

The evaluation value of the first sub-policy network $W_i$ is obtained by inputting, into the first sub-value network $q_i$ for processing, the target state information $S_i$ and the target state information $S_{i+1}$ of the first area covered by the first network device, the output result of the first sub-policy network $W_i$ corresponding to the first network device, a feedback reward corresponding to the first area, and information about K-1 sub-value networks other than the first sub-value network $q_i$, where the feedback reward corresponding to the first area is determined by the terminal in the first area through data transmission based on the second scheduling information corresponding to the first area.

Further, the first network device is further configured to:
  determine a first sub-value network $q_i$ as a first target sub-value network, where the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

Further, when the value of the performance parameter is less than the preset value, the first network device is further configured to:
  input, into the first sub-value network $q_i$ for processing, the target state information $S_i$ and the target state information $S_{i+1}$ of the first area, an output result of the first sub-policy network $W_i$ corresponding to the first network device, a feedback reward corresponding to the first area, and information about K-1 sub-value networks other than the first sub-value network $q_i$, to obtain an evaluation value of the first sub-policy network $W_i$, where the feedback reward corresponding to the first area is determined by the terminal in the first area through data transmission based on the second scheduling information corresponding to the first area; and adjust, by the first network device, a parameter of the first sub-value network $q_i$ to obtain a first sub-value network used for next training.

In still another optional implementation, the scheduling algorithm training system further includes a centralized network element device, and when the value of the performance parameter is not less than the preset value, the centralized network element device is configured to:
  determine a value network $Q_i$ as a target value network, where the value network $Q_i$ is obtained based on a value network that is previously trained.

When the value of the performance parameter is less than the preset value, the centralized network element device is configured to:
  input, into the value network $Q_i$ for processing, target state information of K areas covered by the K network devices, output results of K sub-policy networks corresponding to the K network devices, and feedback rewards corresponding to the K areas, to obtain K evaluation values, where the K evaluation values are in a one-to-one correspondence with the K sub-policy networks;
  respectively send the K evaluation values to the K network devices; and
  adjust a parameter of the value network $Q_i$ to obtain a value network used for next training.

In still another optional implementation, the scheduling algorithm training system further includes a centralized network element device, and when the value of the performance parameter is not less than the preset value, the centralized network element device is configured to:
  determine a first sub-value network $q_i$ as a first target sub-value network, where the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

When the value of the performance parameter is less than the preset value, the centralized network element device is configured to:
  input, into the first sub-value network $q_i$ for processing, the target state information $S_i$ and the target state information $S_{i+1}$ of the first area, an output result of the first sub-policy network $W_i$ corresponding to the first network device, a feedback reward corresponding to the first area, and information about K-1 sub-value networks other than the first sub-value network $q_i$, to obtain an evaluation value of the first sub-policy network $W_i$, where the feedback reward corresponding to the first area is determined by the terminal in the first area through data transmission based on the second scheduling information corresponding to the first area; and adjust a parameter of the first sub-value network $q_i$ to obtain a first sub-value network used for next training.

In this embodiment of this disclosure, the first network device in the K network devices obtains the target state information of the first area, then obtains the scheduling information based on the target state information and the first target sub-policy network corresponding to the first network device, and delivers the scheduling information to the terminal in the first area, so that each terminal in the first area transmits data based on the scheduling information. In the method, each network device performs scheduling control on a policy network corresponding to the network device, to implement multi-agent scheduling control, and improve performance of the scheduling control system. In addition, feasibility of a scheduling control solution is improved by deploying policy networks in a distributed manner.

An embodiment of this disclosure further provides a computer-readable storage medium. The computer-readable storage medium stores instructions. When the instructions are run on a computer or a processor, the computer or the processor is enabled to perform one or more steps in any one of the foregoing methods.

An embodiment of this disclosure further provides a computer program product including instructions. When the computer program product runs on a computer or a processor, the computer or the processor is enabled to perform one or more steps in any one of the foregoing methods.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of this disclosure are generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

A person of ordinary skill in the art may understand that all or some of the procedures of the methods in the foregoing embodiments may be implemented by a computer program instructing related hardware. The program may be stored in a computer-readable storage medium. When the program is executed, the procedures of the methods in the foregoing embodiments may be performed. The storage medium includes any medium that can store program code, for example, a ROM, a random access memory RAM, a magnetic disk, or an optical disc.

The foregoing descriptions are merely specific implementations of the embodiments in this disclosure, but are not intended to limit the protection scope of the embodiments in this disclosure. Any variation or replacement within the technical scope disclosed in the embodiments in this disclosure shall fall within the protection scope of the embodiments in this disclosure. Therefore, the protection scope of the embodiments of this disclosure shall be subject to the protection scope of the claims.

What is claimed is:

1. A scheduling method applied to a scheduling control system comprising K network devices wherein K is an integer greater than 1, the method comprising:

obtaining, by a first network device, target state information of a first area, wherein the first network device is any one of the K network devices, the first area is an area covered by the first network device, and the target state information comprises network state information and user data packet cache information;

generating, by the first network device, first scheduling information based on the target state information of the first area and a first target sub-policy network, wherein the first target sub-policy network is a target sub-policy network that is in K target sub-policy networks and that corresponds to the first network device, and the K target sub-policy networks are in a one-to-one correspondence with the K network devices; and delivering, by the first network device, the first scheduling information to a terminal in the first area, wherein the first scheduling information is used by the terminal in the first area for data transmission.

2. The method according to claim 1, wherein before the generating, by the first network device, of the first scheduling information based on the target state information of the first area and the first target sub-policy network, the method further comprises:

performing, by the first network device, iterative training on a first initial sub-policy network to obtain the first target sub-policy network; and the performing, by the first network device, of the iterative training on the first initial sub-policy network to obtain the first target sub-policy network comprises:

obtaining, by the first network device, a performance parameter based on second target state information $S_{i+1}$ of the first area; and when a value of the performance parameter is not less than a preset value, determining, by the first network device, a first sub-policy network $W_i$ as the first target sub-policy network, wherein i is a positive integer, the second target state information $S_{i+1}$ of the first area is obtained by the terminal in the first area through data transmission based on second scheduling information, the second scheduling information is generated by the first network device based on first target state information $S_i$ of the first area and the first sub-policy network $W_i$, the first target state information $S_i$ is target state information to be used in an $i^{th}$ time of training, and when i=1, the first sub-policy network $W_i$ is the first initial sub-policy network.

3. The method according to claim 2, wherein when the value of the performance parameter is less than the preset value, the first network device adjusts a parameter of the first sub-policy network $W_i$ based on the first target state information $S_i$, an output result of the first sub-policy network $W_i$, the second target state information $S_{i+1}$, and an evaluation value of the first sub-policy network $W_i$, to obtain a first sub-policy network used for next training, wherein the evaluation value of the first sub-policy network $W_i$ is obtained through processing based on a value network $Q_i$, and the value network $Q_i$ is obtained based on a value network that is previously trained.

4. The method according to claim 3, wherein the evaluation value of the first sub-policy network $W_i$ is obtained by inputting, into the value network $Q_i$ for processing, the target state information of K areas covered by the K network devices, output results of K sub-policy networks corresponding to the K network devices, and feedback rewards corresponding to the K areas, wherein the feedback rewards corresponding to the K areas are determined by terminals in the K areas through data transmission based on the second scheduling information respectively corresponding to the K areas.

5. The method according to claim 2, wherein when the value of the performance parameter is less than the preset value, the first network device adjusts a parameter of the first sub-policy network $W_i$ based on the first target state information $S_i$, an output result of the first sub-policy network $W_i$, the second target state information $S_{i+1}$, and an evaluation value of the first sub-policy network $W_i$, to obtain a first sub-policy network used for next training, wherein the evaluation value of the first sub-policy network $W_i$ is obtained through processing based on a first sub-value network $q_i$, the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

6. The method according to claim 5, wherein the evaluation value of the first sub-policy network $W_i$ is obtained by inputting, into the first sub-value network $q_i$ for processing, the first target state information $S_i$ and the second target state information $S_{i+1}$ of the first area covered by the first network device, the output result of the first sub-policy network $W_i$ corresponding to the first network device, a feedback reward corresponding to the first area, and information about K−1 sub-value networks other than the first sub-value network $q_i$, wherein the feedback reward corresponding to the first area is determined by the terminal in the first area through data transmission based on the second scheduling information corresponding to the first area.

7. The method according to claim 1, wherein the scheduling control system further comprises a centralized network element device, and before the generating, by the first network device, of the first scheduling information based on the target state information of the first area and the first target sub-policy network, the method further comprises:
receiving, by the first network device, a parameter that is of the first target sub-policy network and that is sent by the centralized network element device, wherein parameters of the K target sub-policy networks are the same, and the centralized network element device is a core network device or a base station centralized unit device.

8. A scheduling algorithm training method applied to a scheduling algorithm training system comprising K network devices, wherein K is an integer greater than 1, the method comprising:
obtaining, by a first network device, training data, wherein the first network device is any one of the K network devices; and
performing, by the first network device, iterative training on a first initial sub-policy network based on the training data, to obtain a first target sub-policy network, wherein the first initial sub-policy network is an initial sub-policy network that is in K initial sub-policy networks and that corresponds to the first network device, the first target sub-policy network is a target sub-policy network that is in K target sub-policy networks and that corresponds to the first network device, and the K initial sub-policy networks and the K target sub-policy networks are respectively in a one-to-one correspondence with the K network devices.

9. The method according to claim 8, wherein the training data comprises second target state information $S_{i+1}$ of a first area, the first area is an area covered by the first network device, and the performing, by the first network device, of the iterative training on the first initial sub-policy network based on the training data, to obtain the first target sub-policy network comprises:
obtaining, by the first network device, a performance parameter based on the second target state information $S_{i+1}$ of the first area; and when a value of the performance parameter is not less than a preset value, determining, by the first network device, a first sub-policy network $W_i$ as the first target sub-policy network, wherein i is a positive integer, the second target state information $S_{i+1}$ of the first area is obtained by a terminal in the first area through data transmission based on second scheduling information, the second scheduling information is generated by the first network device based on first target state information $S_i$ of the first area and the first sub-policy network $W_i$, the first target state information $S_i$ is target state information to be used in an $i^{th}$ time of training, and when i=1, the first sub-policy network $W_i$ is the first initial sub-policy network.

10. The method according to claim 9, wherein when the value of the performance parameter is less than the preset value, the first network device adjusts a parameter of the first sub-policy network $W_i$ based on the first target state information $S_i$, an output result of the first sub-policy network $W_i$, the second target state information $S_{i+1}$, and an evaluation value of the first sub-policy network $W_i$, to obtain a first sub-policy network used for next training, wherein the evaluation value of the first sub-policy network $W_i$ is obtained through processing based on a value network $Q_i$, and the value network $Q_i$ is obtained based on a value network that is previously trained.

11. The method according to claim 10, wherein the evaluation value of the first sub-policy network $W_i$ is obtained by inputting, into the value network $Q_i$ for processing, the target state information of K areas covered by the K network devices, output results of sub-policy networks respectively corresponding to the K network devices, and feedback rewards corresponding to the K areas, wherein the feedback rewards corresponding to the K areas are determined by terminals in the K areas through data transmission based on the second scheduling information respectively corresponding to the K areas.

12. The method according to claim 9, wherein when the value of the performance parameter is less than the preset value, the first network device adjusts a parameter of the first sub-policy network $W_i$ based on the first target state information $S_i$, an output result of the first sub-policy network $W_i$, the second target state information $S_{i+1}$, and an evaluation value of the first sub-policy network $W_i$, to obtain a first sub-policy network used for next training, wherein the evaluation value of the first sub-policy network $W_i$ is obtained through processing based on a first sub-value network $q_i$, the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

13. The method according to claim 12, wherein the evaluation value of the first sub-policy network $W_i$ is obtained by inputting, into the first sub-value network $q_i$ for processing, the first target state information $S_i$ and the second target state information $S_{i+1}$ of the first area covered by the first network device, the output result of the first sub-policy network $W_i$ corresponding to the first network device, a feedback reward corresponding to the first area, and information about K−1 sub-value networks other than the first sub-value network $q_i$, wherein the feedback reward corresponding to the first area is determined by the terminal in the first area through data transmission based on the second scheduling information corresponding to the first area.

14. The method according to claim 9, wherein the method further comprises:
determining, by the first network device, a first sub-value network $q_i$ as a first target sub-value network, wherein the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

15. The method according to claim 14, wherein when the value of the performance parameter is less than the preset value, the first network device inputs, into the first sub-value network $q_i$ for processing, the first target state information $S_i$ and the second target state information $S_{i+1}$ of the first area, an output result of the first sub-policy network $W_i$ corresponding to the first network device, a feedback reward corresponding to the first area, and information about K−1 sub-value networks other than the first sub-value network $q_i$, to obtain an evaluation value of the first sub-policy network $W_i$, wherein the feedback reward corresponding to the first area is determined by the terminal in the first area through data transmission based on the second scheduling information corresponding to the first area; and the first network device adjusts a parameter of the first sub-value network $q_i$ to obtain a first sub-value network used for next training.

16. The method according to claim 9, wherein the scheduling algorithm training system further comprises a centralized network element device, and when the value of the performance parameter is not less than the preset value, the method further comprises:
determining, by the centralized network element device, a value network $Q_i$ as a target value network, wherein the value network $Q_i$ is obtained based on a value network that is previously trained.

17. The method according to claim 16, wherein when the value of the performance parameter is less than the preset value, the centralized network element device inputs, into the value network $Q_i$ for processing, the target state information of K areas covered by the K network devices, output results of K sub-policy networks corresponding to the K network devices, and feedback rewards corresponding to the K areas, to obtain K evaluation values, wherein the K evaluation values are in a one-to-one correspondence with the K sub-policy networks;
the centralized network element device respectively sends the K evaluation values to the K network devices; and
the centralized network element device adjusts a parameter of the value network $Q_i$ to obtain a value network used for next training.

18. The method according to claim 9, wherein the scheduling algorithm training system further comprises a centralized network element device, and when the value of the performance parameter is not less than the preset value, the method further comprises:
determining, by the centralized network element device, a first sub-value network $q_i$ as a first target sub-value network, wherein the first sub-value network $q_i$ is obtained based on a first sub-value network that is previously trained, the first sub-value network $q_i$ is a sub-value network that is in K sub-value networks and that corresponds to the first network device, and the K sub-value networks are in a one-to-one correspondence with the K network devices.

19. The method according to claim 18, wherein when the value of the performance parameter is less than the preset value, the centralized network element device inputs, into the first sub-value network $q_i$ for processing, the first target state information $S_i$ and the second target state information $S_{i+1}$ of the first area, an output result of the first sub-policy network $W_i$ corresponding to the first network device, a feedback reward corresponding to the first area, and information about K−1 sub-value networks other than the first sub-value network $q_i$, to obtain an evaluation value of the first sub-policy network $W_i$, wherein the feedback reward corresponding to the first area is determined by the terminal in the first area through data transmission based on the second scheduling information corresponding to the first area; and
the centralized network element device adjusts a parameter of the first sub-value network $q_i$ to obtain a first sub-value network used for next training.

20. A computer-readable storage medium that stores a computer program which upon execution by a processor performs operation comprising:
obtaining, by a first network device, target state information of a first area, wherein the first network device is any one of the K network devices, the first area is an area covered by the first network device, and the target state information comprises network state information and user data packet cache information;
generating, by the first network device, first scheduling information based on the target state information of the first area and a first target sub-policy network, wherein the first target sub-policy network is a target sub-policy network that is in K target sub-policy networks and that corresponds to the first network device, and the K target sub-policy networks are in a one-to-one correspondence with the K network devices; and
delivering, by the first network device, the first scheduling information to a terminal in the first area, wherein the first scheduling information is used by the terminal in the first area for data transmission.

* * * * *